(12) United States Patent
Tian

(10) Patent No.: US 11,007,426 B2
(45) Date of Patent: May 18, 2021

(54) GAME CLIENT CONTROL METHOD AND APPARATUS, STORAGE MEDIUM, AND ELECTRONIC APPARATUS

(71) Applicant: TENCENT TECHNOLOGY (SHENZHEN) COMPANY LIMITED, Guangdong (CN)

(72) Inventor: Tian Hao Tian, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/572,716

(22) Filed: Sep. 17, 2019

(65) Prior Publication Data

US 2020/0009453 A1 Jan. 9, 2020

Related U.S. Application Data

(63) Continuation of application No. PCT/CN2018/106529, filed on Sep. 19, 2018.

(30) Foreign Application Priority Data

Sep. 25, 2017 (CN) .......................... 201710877403.8

(51) Int. Cl.
*A63F 13/211* (2014.01)
*G06F 3/0346* (2013.01)
(Continued)

(52) U.S. Cl.
CPC .......... *A63F 13/211* (2014.09); *G06F 3/0346* (2013.01); *G09G 5/38* (2013.01);
(Continued)

(58) Field of Classification Search
CPC .. G06F 3/0346; A63F 13/211; A63F 13/5258; G09G 2340/0492
See application file for complete search history.

(56) References Cited

U.S. PATENT DOCUMENTS

2010/0045667 A1* 2/2010 Kornmann ............ G06F 3/0485
345/419
2010/0214216 A1* 8/2010 Nasiri ..................... A63F 13/06
345/158

(Continued)

FOREIGN PATENT DOCUMENTS

| CN | 105148514 A | 12/2015 |
|---|---|---|
| CN | 105148520 A | 12/2015 |

(Continued)

OTHER PUBLICATIONS

SoloCrowdApps, "Gyro Archer—Mobile Game", Aug. 16, 2014, at (https://www.youtube.com/watch?v=gZACAvLkTas), pp. 1-7, (last visited Sep. 29, 2020). (Year: 2014).*

(Continued)

*Primary Examiner* — Steve Rowland
(74) *Attorney, Agent, or Firm* — Sughrue Mion, PLLC

(57) ABSTRACT

Provided is a game client control method and apparatus, a storage medium, and an electronic apparatus. The method including obtaining first orientation data detected by a target detection apparatus, a game client being installed on a mobile terminal, the target detection apparatus being disposed in the mobile terminal, a game screen of the game client being at a first angle of view according to the first orientation data, and the first orientation data comprising a first orientation of the mobile terminal, obtaining second orientation data detected by the target detection apparatus, the second orientation data including a second orientation of the mobile terminal, and switching the game screen from the game screen at the first angle of view to a game screen at a second angle of view based on relative orientation data between the second orientation data and the first orientation data satisfying a target condition.

19 Claims, 11 Drawing Sheets

(51) Int. Cl.
   *G09G 5/38*        (2006.01)
   *A63F 13/5258*   (2014.01)
(52) U.S. Cl.
   CPC ..... *A63F 13/5258* (2014.09); *A63F 2300/105* (2013.01); *G09G 2340/0492* (2013.01)

(56) References Cited

U.S. PATENT DOCUMENTS

| | | |
|---|---|---|
| 2012/0088582 A1 | 4/2012 | Wu et al. |
| 2013/0084980 A1* | 4/2013 | Hammontree ........ A63F 13/211 |
| | | 463/36 |
| 2013/0196767 A1* | 8/2013 | Garvin .................... A63F 13/04 |
| | | 463/36 |
| 2016/0023113 A1* | 1/2016 | Ye ........................... A63F 13/92 |
| | | 463/31 |
| 2016/0300340 A1* | 10/2016 | Gupta .................. G01B 11/002 |

FOREIGN PATENT DOCUMENTS

| | | |
|---|---|---|
| CN | 105975061 A | 9/2016 |
| CN | 106293070 A | 1/2017 |
| CN | 106648084 A | 5/2017 |

OTHER PUBLICATIONS

SoloCrowdApps, "GA2.pdf", Aug. 16, 2014, at (htttps://www.youtube.com/watch?v=gZACAvLkTas), pp. 1-2, (last visited Jan. 11, 2020). (Year: 2014).*

International Search Report for PCT/CN2018/106529 dated Nov. 27, 2018 [PCT/ISA/210].

\* cited by examiner

GAME CLIENT CONTROL METHOD AND APPARATUS, STORAGE MEDIUM, AND ELECTRONIC APPARATUS

CROSS-REFERENCE TO RELATED APPLICATIONS

This application is a continuation of International Patent Application No. PCT/CN2018/106529 filed on Sep. 19, 2018, which claims priority from China Patent Application No. 201710877403.8, filed in the Chinese Patent Office on Sep. 25, 2017 and entitled "GAME CLIENT CONTROL METHOD AND APPARATUS, STORAGE MEDIUM, AND ELECTRONIC APPARATUS," which are incorporated herein by reference in their entireties.

BACKGROUND

1. Field

Embodiments of the present disclosure relates to the field of games, and specifically, to a game client control method and apparatus, a storage medium, and an electronic apparatus.

2. Description of Related Art

In a gaming environment, a user can operate a game client to move a game screen, so that the game screen is displayed from different angles of view to adapt to operations of the user. For example, for a game on a personal computer (PC) end, a game screen may be moved by moving a mouse to display a part that does not appear in a previous game interface or display the whole game screen. For a mobile terminal, a user may perform a slide operation on a screen with a touch to move the game screen.

When moving a game screen by operating a mouse or by performing a slide operation on a screen with a hand, a user needs to perform a movement operation with a hand, which cannot ensure promptness of game client control, thus resulting in low efficiency of game client control. In addition, in a changing process of the game screen, other interface buttons on the screen may not be operated, and this may also result in failure to ensure the promptness of game client control. Conventionally, the game client may change from a game screen at one angle of view to a game screen at another angle of view, and then perform operations on the game client with interface buttons on the screen at the current angle of view. This lowers the efficiency of game client control and degrades user experience.

SUMMARY

Embodiments of the present disclosure provide a game client control method and apparatus, a storage medium, and an electronic apparatus, to resolve the technical problem of low efficiency of game client control in the related technology.

According to an embodiment, there is provided a game client control method, the method performed by at least one processor including obtaining first orientation data detected by a target detection apparatus, a game client being installed on a mobile terminal, the target detection apparatus being disposed in the mobile terminal, a game screen of the game client being at a first angle of view according to the first orientation data, and the first orientation data including a first orientation of the mobile terminal; obtaining, during movement of the mobile terminal, second orientation data detected by the target detection apparatus, the second orientation data including a second orientation of the mobile terminal, and the second orientation being different from the first orientation; and switching the game screen displayed by the game client from the game screen at the first angle of view to a game screen at a second angle of view based on relative orientation data between the second orientation data and the first orientation data satisfying a target condition, the second angle of view being different from the first angle of view.

According to another embodiment, there is provided a game client control apparatus including at least one memory configured to store computer program code and at least one processor configured to access the computer program code and operate as instructed by the computer program code. The computer program code including first obtaining code configured to cause the at least one processor to obtain first orientation data detected by a target detection apparatus, a game client being installed on a mobile terminal, the target detection apparatus being disposed in the mobile terminal, a game screen of the game client being at a first angle of view according to the first orientation data, and the first orientation data including a first orientation of the mobile terminal; second obtaining code configured to cause the at least one processor to obtain, during movement of the mobile terminal, second orientation data detected by the target detection apparatus, the second orientation data including a second orientation of the mobile terminal, and the second orientation being different from the first orientation; and control code configured to cause the at least one processor to switch the game screen displayed by the game client from the game screen at the first angle of view to a game screen at a second angle of view based on relative orientation data between the second orientation data and the first orientation data satisfying a target condition, the second angle of view being different from the first angle of view.

According to another embodiment, there is provided a non-transitory computer-readable storage medium, storing executable instructions, the executable instructions capable of causing a computer to: obtain first orientation data detected by a target detection apparatus, a game client being installed on a mobile terminal, the target detection apparatus being disposed in the mobile terminal, a game screen of the game client being at a first angle of view according to the first orientation data, and the first orientation data including a first orientation of the mobile terminal; obtain, during movement of the mobile terminal, second orientation data detected by the target detection apparatus, the second orientation data including a second orientation of the mobile terminal, and the second orientation being different from the first orientation; and switch the game screen displayed by the game client from the game screen at the first angle of view to a game screen at a second angle of view based on relative orientation data between the second orientation data and the first orientation data satisfying a target condition, the second angle of view being different from the first angle of view.

BRIEF DESCRIPTION OF THE DRAWINGS

The accompanying drawings described herein are provided for further understanding of the present disclosure. Embodiments of the present disclosure and the description thereof are used for illustration, but are not intended to limit the scope of the present disclosure.

DESCRIPTION OF EMBODIMENTS

To help a person skilled in the art better understand the solution of the present disclosure, the following describes the technical solutions with reference to the accompanying drawings in the embodiments of the present disclosure. Embodiments described herein are some, rather than all, of the embodiments of the present disclosure. All other embodiments obtained by a person of ordinary skill in the art based on the embodiments herein without creative efforts shall fall within the protection scope of the present disclosure.

The terms such as "first" and "second" in the specification, claims, and accompanying drawings of the present disclosure are merely used for differentiating similar objects, and are not necessarily used for describing a specific sequence or order. It is to be appreciated that, data used in such a manner can be interchanged in an appropriate case, so that the embodiments described herein may be implemented in a sequence other than those depicted or described herein. In addition, the terms "include", "have", and any variation thereof are intended to cover a non-exclusive inclusion. Therefore, in the context of a process, a method, a system, a product or a device that includes a series of steps or units, the process, method, system, product or device, not only includes the steps or units listed, but also includes other steps or units not specified, explicitly or inherently to the process, method, system, product or device.

According to an aspect of the embodiments, an embodiment of a game client control method is provided.

Figure 1:
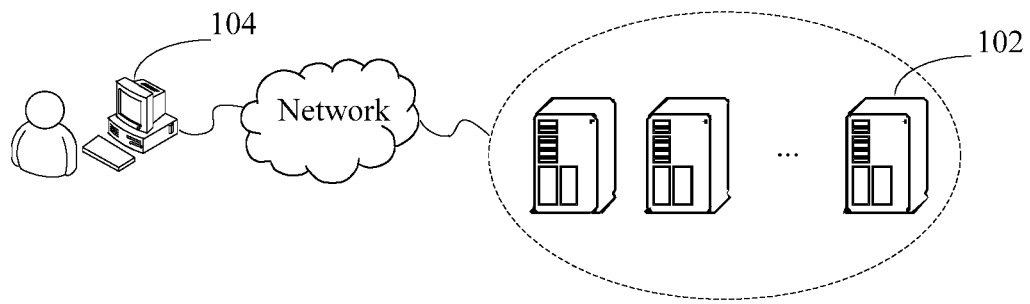
FIG. 1 is a schematic diagram of a hardware environment according to an embodiment.

According to an embodiment, the game client control method may be performed by a hardware environment including a server 102 and a terminal 104 shown in FIG. 1. FIG. 1 is a schematic diagram of a hardware environment according to an embodiment. As shown in FIG. 1, the server 102 may be connected to the terminal 104 through a network. The network may include, but is not limited to a wide area network, a metropolitan area network, or a local area network. The terminal 104 is not limited to a PC, a mobile phone, a tablet computer, and the like. The game client control method according to the embodiments may be performed by the server 102, or may be performed by the terminal 104, or may be performed by the combination of the server 102 and the terminal 104. The game client control method according to the embodiments performed by the terminal 104 may also be performed by a client installed on the terminal 104.

Figure 2:
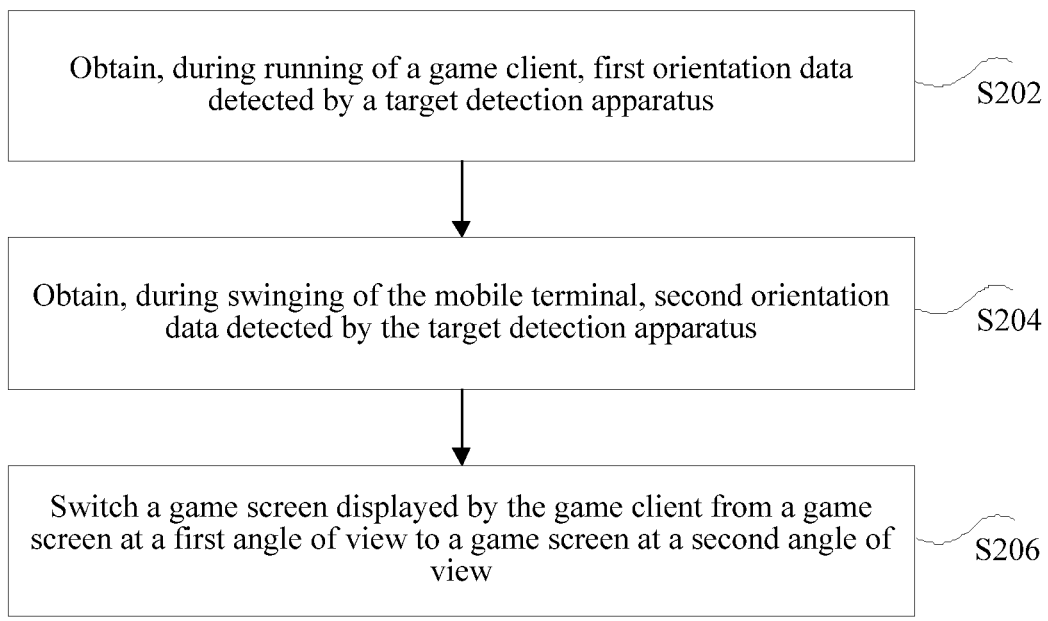
FIG. 2 is a flowchart of a game client control method according to an embodiment.

FIG. 2 is a flowchart of a game client control method according to an embodiment. As shown in FIG. 2, the method may include the following steps.

In step S202, the method may include obtaining, during running of a game client, first orientation data detected by a target detection apparatus.

In the foregoing step S202, during running of the game client, the first orientation data detected by the target detection apparatus may be obtained. The game client may be installed on a mobile terminal, and an application program related to the game client may run on the mobile terminal. The target detection apparatus may be disposed in a mobile terminal. A game screen of the game client may be at a first angle of view according to the first orientation data. The first orientation data is used for indicating a first orientation of the mobile terminal.

The game client in this embodiment may be a game client of multiplayer online battle arena games (MOBA). Game screens at different angles of view may be displayed through a movement of a lens. The lens may be a camera. The mobile terminal may include, but is not limited to, terminal devices such as a smartphone, a tablet computer, a palmtop computer, a mobile Internet device, and a PAD. The target detection apparatus may be disposed in the mobile terminal. The target detection apparatus may swing as the mobile terminal swings. The target detection apparatus may be configured to detect data about an orientation of the mobile terminal. For example, the target detection apparatus may be a gyroscope. The gyroscope is an angular velocity sensor, which is different from an accelerometer, and a physical quantity measured by the gyroscope is a rotational angular velocity during deflection or inclining. The orientation of the mobile terminal may be determined by detecting the orientation of the target detection apparatus. The orientation may include a position and a direction of the mobile terminal. The target detection apparatus may not only detect a change in position data of the mobile terminal, but also may detect a change in direction data of the mobile terminal. Alternatively, the target detection apparatus may also be a gravity sensor. In a case that the orientation of the mobile terminal changes, the game screen also changes.

During the operation of the game client, the first orientation data detected by the target detection apparatus may be obtained. The game screen of the game client may be at the first angle of view according to the first orientation data. That is, the game screen of the game client is at the first angle of view according to the first orientation indicated by the first orientation data.

Furthermore, the first orientation may include a first direction and a first position. The first orientation data may include first direction data and first position data. The first direction data may be used for indicating the first direction in which the mobile terminal is directed, and the first position data is used for indicating the first position where the mobile terminal is located.

In step S204, the method may include obtaining, during swinging of the mobile terminal, second orientation data detected by the target detection apparatus.

In the foregoing step S204, during swinging of the mobile terminal, the second orientation data detected by the target detection apparatus may be obtained. The second orientation data may be used for indicating a second orientation of the mobile terminal, and the second orientation may be different from the first orientation.

According to an embodiment, during the operation of the game client, the mobile terminal may perform a swing behavior. The swing behavior may be generated from deflection, inclining, or the like, for example, a rotation behavior, a flipping behavior, or the like. The target detection apparatus may detect orientation data of the mobile terminal in real time. After obtaining the first orientation data detected by the target detection apparatus, during swinging of the mobile terminal, the second orientation data detected by the target detection apparatus may be obtained. The second orientation data may be used for indicating a second orientation of the mobile terminal.

In addition, the second orientation data in this embodiment may indicate an orientation where the mobile terminal finally stops during swinging.

The second orientation may include a second direction and a second position. The second orientation data may include second direction data and second position data. The second direction data may be used for indicating the second direction in which the mobile terminal is directed, and the second position data may be used for indicating the second position where the mobile terminal is located.

In step S206, the method may include switching a game screen displayed by the game client from a game screen at a first angle of view to a game screen at a second angle of view.

In the foregoing step S206, in a case that relative orientation data between the second orientation data and the first orientation data meets a target condition, the game screen displayed by the game client may be switched from the game screen at the first angle of view to the game screen at the second angle of view. The second angle of view may be different from the first angle of view.

After obtaining the second orientation data detected by the target detection apparatus, the relative orientation data between the first orientation data and the second orientation data may be calculated. The relative orientation data may be used for changing the first orientation to be the second orientation. It may determine whether the relative orientation data meets the target condition. The target condition may be used for triggering the game screen displayed by the game client to be switched from the game screen at the first angle of view to the game screen at the second angle of view. That is, after the triggering condition is met, the game screen displayed by the game client may be switched from the game screen at the first angle of view to the game screen at the second angle of view. The target condition may be used to limit a switching range of the game screen displayed by the game client. That is, when the target condition is met, the game screen of the game client may be restricted from switching from the game screen at the first angle of view to a game screen out of the switching range.

The target condition may be a condition for determining whether the relative orientation data exceeds a first threshold, or may be a condition for determining whether the relative orientation data is greater than the first threshold and less than a second threshold. The first threshold and the second threshold may be predetermined or set by a user. Therefore, based on the setting of the target condition, erroneous operations in switching the game screen upon slight swinging of the mobile terminal may be avoided, thereby ensuring a reliable operation.

Also, the first threshold may be a flipping range. When a flipping angle of the target detection apparatus exceeds the flipping range as the mobile terminal flips, the game screen displayed by the game client may be moved starting from the game screen at the first angle of view to, for example, the flipping range of 5°.

In a case that the relative orientation data between the second orientation data and the first orientation data meets the target condition, the game screen displayed by the game client may be switched from the game screen at the first angle of view to the game screen at the second angle of view. The second angle of view may be different from the first angle of view. The game screen at the second angle of view may be a game screen that a user expects the game client to display in order to smoothly operate the game client.

For example, when a virtual character in the game client wants to attack an enemy precisely through a spell button and the position of the enemy is not displayed on the game screen, the mobile terminal installed with the target detection apparatus may be swung, so that the game screen is switched to a screen including the position of the enemy. Accordingly, the user may spot the enemy quickly and attack the enemy precisely, thereby avoiding an unnecessary manual slide operation on a screen, and improving control efficiency of the game client.

For another example, when a virtual character in the game client wants to observe a situation of a target area, but the target area is not displayed in the game screen, the mobile terminal installed with the target detection apparatus may be swung, so that the game screen is switched to a screen including the target area, and the situation of the target area can be observed, thereby avoiding an unnecessary manual slide operation on a screen, and improving control efficiency of the game client.

Through the foregoing step S202 to step S206, during the operation of a game client, first orientation data detected by a target detection apparatus may be obtained, a game screen of the game client being at a first angle of view according to the first orientation data; second orientation data detected by the target detection apparatus may be obtained, the second orientation data being used for indicating a second orientation of a mobile terminal; in a case that relative orientation data between the second orientation data and the first orientation data meets a target condition, the game screen displayed by the game client is switched from the game screen at the first angle of view to a game screen at a second angle of view. Orientation data of the mobile terminal during swinging may be detected by the target detection apparatus, and in a case that a change in the orientation data meets a particular condition, changing of the game screen may be controlled so that an unnecessary manual slide operation on a screen is avoided, thereby achieving a technical effect of improving control efficiency of the game client, and resolving the technical problem of low efficiency of game client control in the related technology.

In step S206, in the process of switching the game screen displayed by the game client from the game screen from the first angle of view to a game screen to a second angle of view, an operation instruction may be received through the game client to control the game client to perform a target operation.

The game client control method provided in this embodiment may be performed by a mobile terminal or may be performed by a combination of a server and a mobile terminal. In a case that the game client control method is performed by the combination of the server and the mobile terminal, the first orientation data and the second orientation data in steps S202 and S204 may be obtained by the server from the mobile terminal. In step S206, the server may determine whether the relative orientation data meets the target condition, and instruct the mobile terminal to switch the game screen displayed by the game client from the game screen at the first angle of view to the game screen at the second angle of view.

Figure 3:
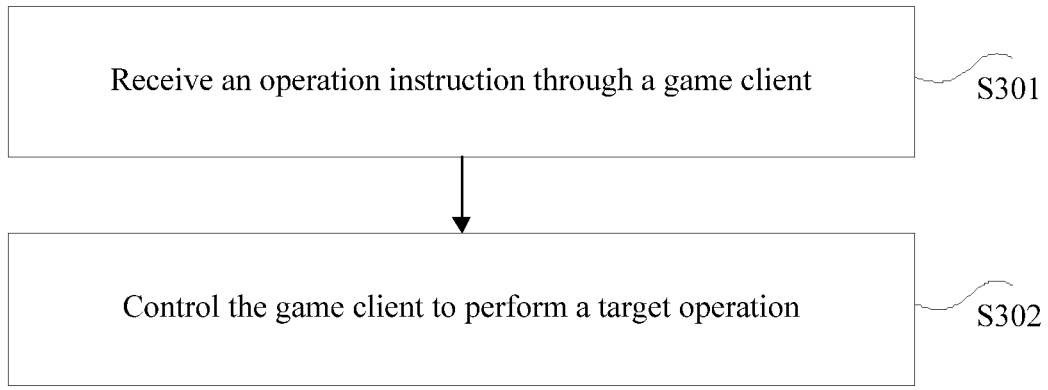
FIG. 3 is a flowchart of another game client control method according to an embodiment.

FIG. 3 is a flowchart of another game client control method according to an embodiment. As shown in FIG. 3, the method may further include the following steps.

In step S301, the method may include receiving an operation instruction through the game client.

In the foregoing step S301, the operation instruction is received through the game client. The operation instruction may be used for instructing the game client to perform a target operation.

In the process of switching the game screen displayed by the game client from the game screen at the first angle of view to the game screen at the second angle of view, a user may operate an interface button of the game client, so as to operate the game client through the interface button. The operation instruction may be received through the game client. The operation instruction corresponds to a target operation performed by the game client. The operation instruction may be a click operation instruction, and the click operation instruction may be used for instructing the game client to perform, for example, a spell casting operation.

In step S302, the method may include controlling the game client to perform a target operation.

In the foregoing step S302, after the operation instruction is received, the game client may be controlled to perform the target operation.

After receiving the operation instruction through the game client, according to the operation instruction, the game client may be controlled to perform the target operation. For example, the operation instruction may be a click operation instruction. After receiving the operation instruction through the game client, the game client may be instructed to perform, for example, a spell casting operation.

According to an embodiment, in the process of switching the game screen displayed by the game client from the game screen at the first angle of view to the game screen at the second angle of view, the operation instruction is received through the game client, thereby controlling the game client to perform the target operation according to the operation instruction. As such, a manual slide operation on a screen of the game client may be avoided. The problem that other operations cannot be performed in the process of displaying game screens at different angles of view may be resolved, thereby achieving a technical effect of improving control efficiency of the game client.

According to another embodiment, in step S206, before the game screen displayed by the game client is switched from the game screen at the first angle of view to the game screen at the second angle of view, the method may further include obtaining rotation data for changing the first orientation data to be the second orientation data, and determining that the relative orientation data meets the target condition in a case that the rotation data is greater than or equal to a first threshold.

Figure 4:
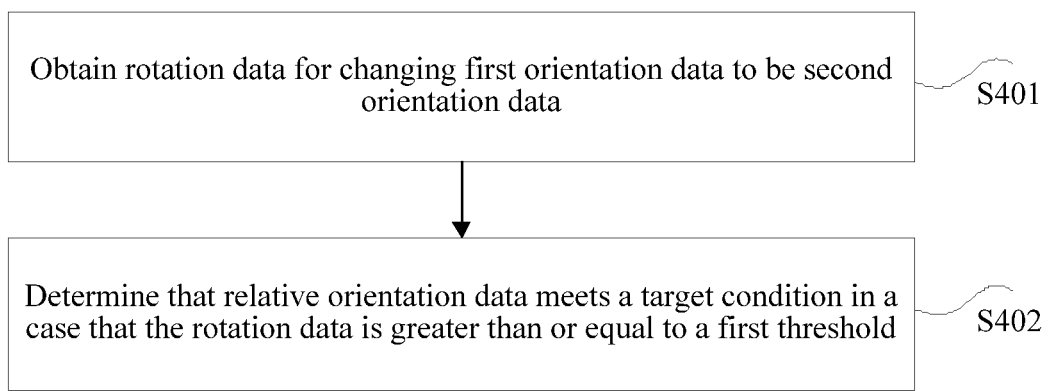
FIG. 4 is a flowchart of another game client control method according to an embodiment.

FIG. 4 is a flowchart of another game client control method according to an embodiment. As shown in FIG. 4, the method may further include the following steps.

In step S401, the method may include obtaining rotation data for changing the first orientation data to be the second orientation data.

In the foregoing step S401, the rotation data for changing the first orientation data to be the second orientation data may be obtained. The rotation data may be used for indicating a rotation angle by which the mobile terminal rotates from a first orientation to a second orientation. The relative orientation data may include the rotation data.

According to an embodiment, the mobile terminal may rotate from the first orientation to the second orientation. The second orientation may be obtained after rotation from the first orientation by a particular rotation angle. The rotation angle is indicated by using the rotation data for changing the first orientation data to be the second orientation data. For example, the rotation data may be in degrees of rotation. The relative orientation data may include the rotation data. Before the game screen displayed by the game client is switched from the game screen at the first angle of view to the game screen at the second angle of view, the rotation data may be obtained.

In step S402, the method may include determining that relative orientation data meets a target condition in a case that the rotation data is greater than or equal to a first threshold.

In the foregoing step S402, in a case that the rotation data is greater than or equal to the first threshold, it is determined that the relative orientation data meets the target condition.

After obtaining the rotation data for changing the first orientation data to be the second orientation data, it is determined whether the rotation data meets the target condition. It may be determined whether the rotation data is greater than or equal to the first threshold. For example, the rotation data may include a rotation angle, and the first threshold may be a target angle. In this case, it is determined whether the rotation angle for changing the first orientation data to be the second orientation data is greater than or equal to the target angle. In a case that the rotation data is greater than or equal to the first threshold, it is determined that the relative orientation data meets the target condition. Therefore, erroneous operations in switching the game screen upon slight swinging of the mobile terminal may be avoided, thereby ensuring the reliability of operations.

Additionally, with a smaller first threshold, it may be easier to trigger the game screen displayed by the game client to move starting from the game screen at the first angle of view.

In this embodiment, before the game screen displayed by the game client is switched from the game screen at the first angle of view to the game screen at the second angle of view, the rotation data for changing the first orientation data to be the second orientation data may be obtained. In a case that the rotation data is greater than or equal to the first threshold, it is determined that the relative orientation data meets the target condition. Accordingly, in a case the relative orientation data between the second orientation data and the first orientation data meets the target condition, the game screen displayed by the game client is switched from the game screen at the first angle of view to the game screen at the second angle of view, thereby achieving the technical effect of improving control efficiency of the game client.

In another implementation, the step S401 of obtaining rotation data for changing first orientation data to be second orientation data may further include obtaining first rotation data about rotation of the mobile terminal around a first coordinate axis and second rotation data about rotation of the mobile terminal around a second coordinate axis during changing from the first orientation data to the second orientation data. In addition, the step S402 of determining that relative orientation data meets a target condition in a case that the rotation data is greater than or equal to a first threshold may further include determining that the relative orientation data meets the target condition in a case that the first rotation data is greater than or equal to the first threshold, and the second rotation data is greater than or equal to the first threshold.

Figure 5:
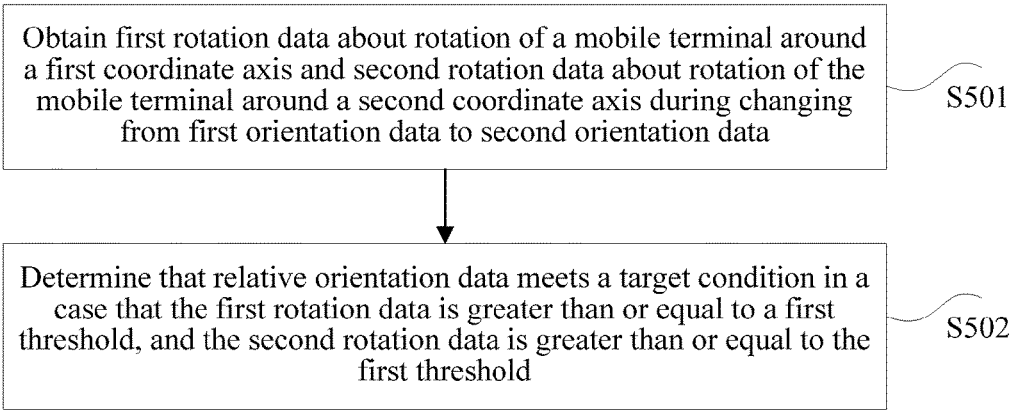
FIG. 5 is a flowchart of a method for obtaining rotation data for changing first orientation data to second orientation data according to an embodiment.

FIG. 5 is a flowchart of obtaining rotation data for changing first orientation data to be second orientation data according to an embodiment. As shown in FIG. 5, the method may further include the following steps.

In step S501, the method may include obtaining first rotation data about rotation of the mobile terminal around a first coordinate axis and second rotation data about rotation of the mobile terminal around a second coordinate axis during changing from the first orientation data to the second orientation data.

In the foregoing step S501, the first rotation data about rotation of the mobile terminal around the first coordinate axis and the second rotation data about rotation of the mobile terminal around the second coordinate axis, during changing from the first orientation data to the second orientation data, may be obtained. The first rotation data may be used for indicating a rotation angle by which the mobile terminal rotates around the first coordinate axis, and the second rotation data may be used for indicating a rotation angle by which the mobile terminal rotates around the second coordinate axis.

Before switching the game screen displayed by the game client from the game screen at the first angle of view to the game screen at the second angle of view, the first rotation data on the rotation of the mobile terminal around the first coordinate axis during changing from the first orientation data to the second orientation data is obtained, where the first rotation data may be a first rotation angle by which the mobile terminal rotates around the first coordinate axis, and the second rotation data about rotation of the mobile terminal around the second coordinate axis is obtained, where the second rotation data may be a second rotation angle by which the mobile terminal rotates around the second coordinate axis. The first coordinate axis and the second coordinate axis may be coordinate axes of a target coordinate system. The target coordinate system may be a spatial coordinate system. The first coordinate axis may be an X-axis, the first rotation angle may be Rx, the second coordinate axis may be a Y-axis, and the first rotation angle is Ry.

In step S502, the method may include determining that the relative orientation data meets the target condition in a case that the first rotation data is greater than or equal to the first threshold and the second rotation data is greater than or equal to the first threshold.

The relative orientation data between the second orientation data and the first orientation data may include the first rotation data and the second rotation data. After obtaining the first rotation data on the rotation of the mobile terminal around the first coordinate axis and the second rotation data on the rotation of the mobile terminal around the second coordinate axis, it may be determined whether the first rotation data is greater than or equal to the first threshold and whether the second rotation data is greater than or equal to the first threshold. For example, it is determined whether the first rotation data is greater than or equal to 5°, and it is determined whether the second rotation data is greater than or equal to 5°. If it is determined that the first rotation data is greater than or equal to the first threshold and it is determined that the second rotation data is greater than or equal to the first threshold, the relative orientation data meets the target condition.

Accordingly, in a case that the relative orientation data between the second orientation data and the first orientation data meets the target condition, the game screen displayed by the game client may be switched from the game screen at the first angle of view to the game screen at the second angle of view, thereby achieving the technical effect of improving control efficiency of the game client.

In another embodiment, the step S206 of switching the game screen displayed by the game client from the game screen at the first angle of view to a game screen at a second angle of view in a case that relative orientation data between the second orientation data and the first orientation data meets a target condition may further include obtaining a first coordinate value corresponding to the first rotation data and a second coordinate value corresponding to the second rotation data; and moving the game screen at the first angle of view by the first coordinate value in the first direction and moving the game screen at the first angle of view by the second coordinate value in the second direction in a case that it is determined that the relative orientation data meets the target condition.

Figure 6:
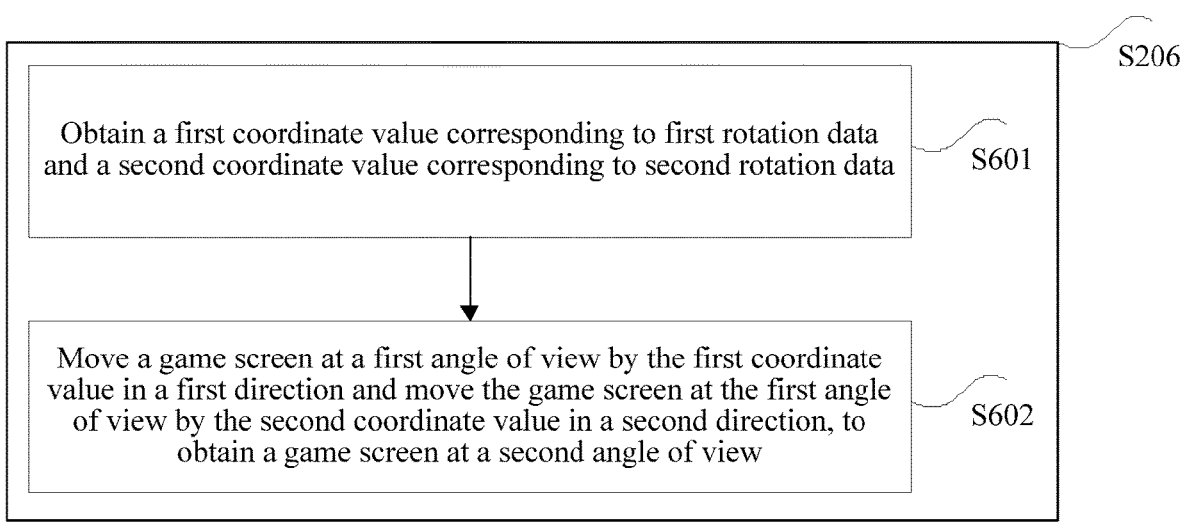
FIG. 6 is a flowchart of a method for switching a game screen displayed by a game client from a game screen at a first angle of view to a game screen at a second angle of view according to an embodiment.

FIG. 6 is a flowchart of a method for switching a game screen displayed by a game client from a game screen at a first angle of view to a game screen at a second angle of view according to an embodiment. As shown in FIG. 6, the method may include the following steps.

In step S601, the method may include obtaining a first coordinate value corresponding to the first rotation data and a second coordinate value corresponding to the second rotation data.

In the foregoing step S601, the first coordinate value corresponding to the first rotation data and the second coordinate value corresponding to the second rotation data are obtained. Here, the first coordinate value is used for determining the game screen at the second angle of view in a first direction, and the second coordinate value is used for determining the game screen at the second angle of view in a second direction.

When the relative orientation data between the second orientation data and the first orientation data meets the target condition, the first coordinate value corresponding to the first rotation data may be obtained. For example, a first coordinate value x corresponding to a first rotation angle Rx may be obtained, so as to determine the game screen at the second angle of view in the first direction corresponding to the first coordinate value. The second coordinate value corresponding to the second rotation data may be obtained.

For example, a second coordinate value y corresponding to a second rotation angle Rx may be obtained, so as to determine the game screen at the second angle of view in the second direction.

The first coordinate value and the second coordinate value may be coordinate values of a coordinate system on a camera, and may be used for displaying game screens at different angles of view.

In step S602, the method may include moving the game screen at the first angle of view by the first coordinate value in the first direction and moving the game screen at the first angle of view by the second coordinate value in the second direction, to obtain the game screen at the second angle of view.

In the foregoing step S602, in a case that it is determined that the relative orientation data meets the target condition, the game screen at the first angle of view may be moved by the first coordinate value in the first direction, and the game screen at the first angle of view may be moved by the second coordinate value in the second direction, to obtain the game screen at the second angle of view.

After obtaining the first coordinate value corresponding to the first rotation data and the second coordinate value corresponding to the second rotation data, the game screen at the first angle of view may be moved by the first coordinate value in the first direction. For example, the game screen at the first angle of view may be moved by a coordinate value x along an x-axis direction. The game screen at the first angle of view may be further moved by the second coordinate value in the second direction. For example, the game screen at the first angle of view may be moved by a coordinate value y along a y-axis direction. The game screen at the first angle of view may be moved by the first coordinate value in the first direction, and the game screen at the first angle of view is moved by the second coordinate value in the second direction, thereby finally achieving the objective of obtaining the game screen at the second angle of view.

According to an embodiment, in a case that the relative orientation data between the second orientation data and the first orientation data meets the target condition, the first coordinate value corresponding to the first rotation data and the second coordinate value corresponding to the second rotation data may be obtained. When it is determined that the relative orientation data meets the target condition, the game screen at the first angle of view may be moved by the first coordinate value in the first direction, and the game screen at the first angle of view is moved by the second coordinate value in the second direction, to obtain the game screen at the second angle of view, thereby achieving the objective of switching the game screen displayed by the game client from the game screen at the first angle of view to the game screen at the second angle of view, and achieving the technical effect of improving control efficiency of the game client.

In another embodiment, the step S206 of switching the game screen displayed by the game client from the game screen at the first angle of view to a game screen at a second angle of view in a case that relative orientation data between the second orientation data and the first orientation data meets a target condition may further include moving the game screen at the first angle of view by a target movement distance corresponding to the first threshold, to obtain the game screen at the second angle of view.

In this embodiment, a movement distance of the game screen at the first angle of view may be determined according to the first threshold, in which the first threshold may correspond to a target distance. In a case that the relative orientation data between the second orientation data and the first orientation data meets the target condition, for example, in a case that the rotation data is greater than or equal to the first threshold, it is determined that the relative orientation data meets the target condition. The game screen at the first angle of view may be moved by the target movement distance corresponding to the first threshold, so as to obtain the game screen at the second angle of view, thereby achieving the technical effect of improving control efficiency of the game client.

In another embodiment, the step S502 of determining that the relative orientation data meets the target condition in a case that the rotation data is greater than or equal to a first threshold may further include determining that the relative orientation data meets the target condition in a case that the rotation data is greater than or equal to the first threshold and is less than a second threshold.

In this embodiment, when it is determined whether the relative orientation data meets the target condition, in addition to determining whether the rotation data is greater than or equal to the first threshold, it is further determined whether the rotation data is less than the second threshold. The second threshold may be a target angle, and it may be determined whether the rotation data for changing the first orientation data to be the second orientation data is less than the second threshold. When the rotation data is greater than or equal to the first threshold and is less than the second threshold, it is determined that the relative orientation data meets the target condition, thereby reducing erroneous operations of the mobile terminal during switching of the game screen, thereby improving the reliability of operations.

Furthermore, before step S206 of switching the game screen displayed by the game client from the game screen at the first angle of view to a game screen at a second angle of view, a first adjustment parameter for adjusting the first threshold to be a third threshold may be received, and step S502 of determining whether the relative orientation data meets the target condition when the rotation data is greater than or equal to a first threshold may further include determining that the relative orientation data meets the target condition in a case that the rotation data is greater than or equal to the third threshold.

Figure 7:
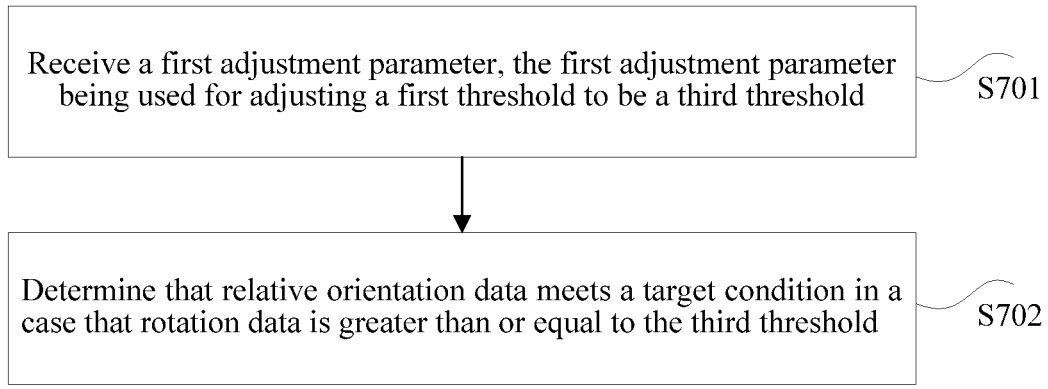
FIG. 7 is a flowchart of another game client control method according to an embodiment.

FIG. 7 is a flowchart of another game client control method according to an embodiment. As shown in FIG. 7, the method may include the following steps.

In step S701, the method may include receiving a first adjustment parameter, the first adjustment parameter being used for adjusting the first threshold to be a third threshold.

In the foregoing step S701, the first adjustment parameter is received. The first adjustment parameter is used for adjusting the first threshold to be the third threshold.

In this embodiment, a threshold for determining whether the relative orientation data between the second orientation data and the first orientation data meets the target condition may be a default threshold, and the default threshold may also be adjusted. Alternatively, a target interface of the game client may be used for setting a parameter for game screen switching. The first adjustment parameter may be received through the target interface of the game client. Through the first adjustment parameter, the first threshold may be adjusted to be a third threshold. In addition, the target interface of the game client may display an adjustment range of the threshold. The adjustment range of the threshold may be indicated by using a target icon and text information. For example, a circular icon may be used for indicating whether the threshold is set to a greater value or a smaller value, so as to configure operation habits of different users, thereby improving user experience.

Further, a function of the game client for setting the parameter for game screen switching may be disabled by default. The parameter for game screen switching may be set after the function is enabled.

In step S702, the method may include determining whether the relative orientation data meets the target condition in a case that the rotation data is greater than or equal to the third threshold.

After the first threshold is adjusted to be the third threshold by using the first adjustment parameter, it may be determined whether the rotation data is greater than or equal to the third threshold. If it is determined that the rotation data is greater than or equal to the third threshold, the relative orientation data meets the target condition.

In this embodiment, before the game screen displayed by the game client is switched from the game screen at the first angle of view to the game screen at the second angle of view, the first threshold may be adjusted to be the third threshold by using the first adjustment parameter. In a case that the rotation data is greater than or equal to the third threshold, it may be determined that the relative orientation data meets the target condition. As such, the game screen displayed by the game client may be switched from the game screen at the first angle of view to the game screen at the second angle of view, thereby achieving the technical effect of improving control efficiency of the game client.

In another embodiment, before step S206 of switching the game screen displayed by the game client from the game screen at the first angle of view to a game screen at a second angle of view, the method may further include receiving a second adjustment parameter, the second adjustment parameter being used for adjusting a changing speed at which the game screen changes from the first angle of view to the second angle of view, to obtain a target changing speed and may further include controlling the game screen of the game client to change from the first angle of view to the second angle of view according to the target changing speed.

Figure 8:
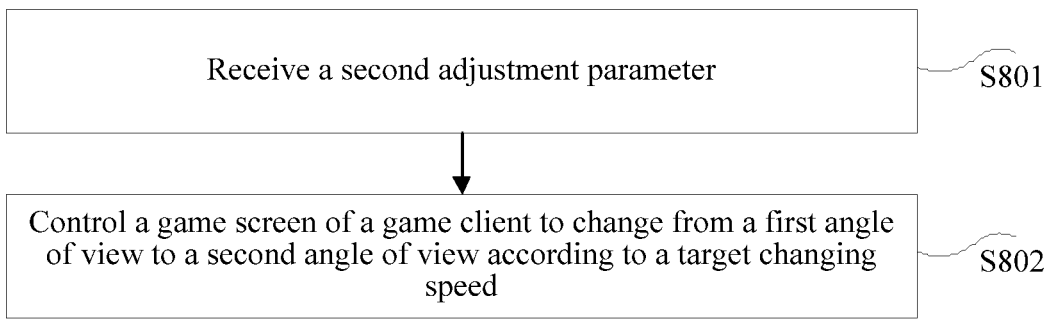
FIG. 8 is a flowchart of another game client control method according to an embodiment.

FIG. 8 is a flowchart of another game client control method according to an embodiment. As shown in FIG. 8, the method may include the following steps.

In step S801, the method may include receiving a second adjustment parameter.

In the foregoing step S801, the second adjustment parameter may be received. The second adjustment parameter may be used for adjusting a changing speed at which the game screen changes from the first angle of view to the second angle of view, to obtain a target changing speed.

In this embodiment, a changing speed at which the game screen changes from the first angle of view to the second angle of view may be a default speed, and the default speed may also be adjusted. Alternatively, the second adjustment parameter may be received through the target interface of the game client. By using the second adjustment parameter, the changing speed at which the game screen changes from the first angle of view to the second angle of view may be adjusted, where the changing speed may include a lens movement speed of the game screen, and thereby obtaining the target changing speed. In addition, the target interface of the game client may display an adjustment range of the changing speed. The adjustment range of the changing speed may be indicated by using a target icon and text information. For example, a circular icon may be used for indicating whether the changing speed is set to be slower or faster. When the target changing speed is set to a greater value, the target detection apparatus corresponds to a greater movement distance of the game screen along with the rotation angle of the mobile terminal. That is, the game screen displayed by the game client may be switched from the game screen at the first angle of view to the game screen at the second angle of view at a higher speed.

In step S802, the method may include controlling the game screen of the game client to change from the first angle of view to the second angle of view according to a target changing speed.

In the foregoing step S802, the game screen of the game client may be controlled to change from the first angle of view to the second angle of view according to the target changing speed.

After adjusting the changing speed at which the game screen changes from the first angle of view to the second angle of view by using the second adjustment parameter, the game screen of the game client may be controlled to change from the first angle of view to the second angle of view according to the target changing speed, thereby switching the game screen displayed by the game client from the game screen at the first angle of view to the game screen at the second angle of view.

In this embodiment, before the game screen displayed by the game client is switched from the game screen at the first angle of view to the game screen at the second angle of view, the changing speed at which the game screen changes from the first angle of view to the second angle of view may be adjusted by using the second adjustment parameter, to obtain the target changing speed, so as to configure operation habits of different users. Moreover, the game screen of the game client may be controlled to change from the first angle of view to the second angle of view according to the target changing speed, thereby switching the game screen displayed by the game client from the game screen at the first angle of view to the game screen at the second angle of view, and improving control efficiency of the game client.

In another embodiment, after step S206 of switching the game screen displayed by the game client from the game screen at the first angle of view to a game screen at a second angle of view, the method may further include receiving a resetting instruction for resetting an angle of view of the game screen, to obtain a third angle of view, saving the second orientation data after receiving the resetting instruction, and obtaining third orientation data detected by the target detection apparatus. Thereafter, the method may switch the game screen displayed by the game client from the game screen at the third angle of view to a game screen at a fourth angle of view in a case that relative orientation data between the third orientation data and the second orientation data meets the target condition, the third angle of view being different from the fourth angle of view.

Figure 9:
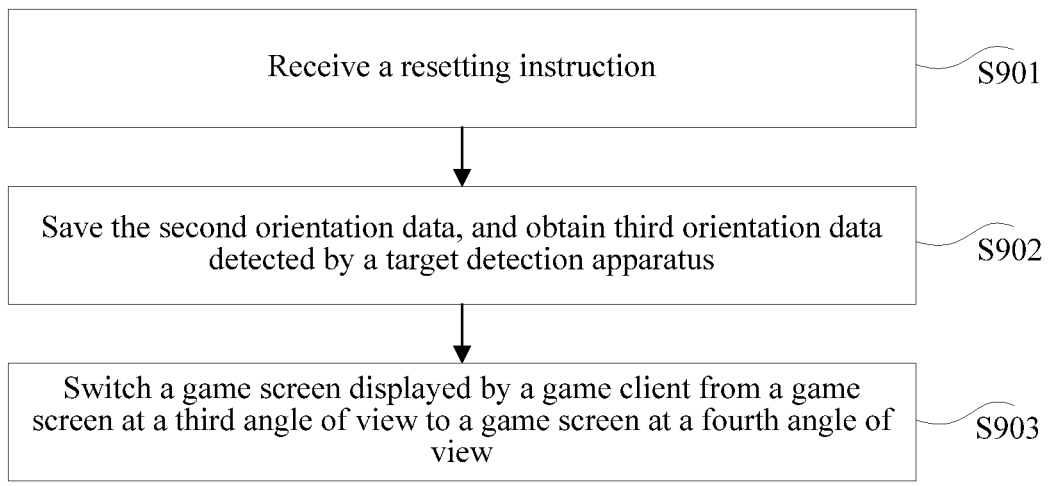
FIG. 9 is a flowchart of yet another game client control method according to an embodiment.

FIG. 9 is a flowchart of another game client control method according to an embodiment. As shown in FIG. 9, the method may further include the following steps.

In step S901, the method may include receiving a resetting instruction.

In the foregoing step S901, the resetting instruction is received. The resetting instruction may be used for resetting an angle of view of the game screen, to obtain a third angle of view.

In this embodiment, the angle of view of the game screen may be reset. When the position of the mobile terminal is deviated, for example, when the second orientation data changes with respect to the first orientation data in a third coordinate axis, it may be determined that the position of the mobile terminal is deviated and the angle of view of the game screen needs to be reset. That is, a camera for controlling the angle of view of the game screen may be reset. For example, a lens for controlling the angle of view of the game screen may be reset. In addition, after the game screen displayed by the game client is switched from the game screen at the first angle of view to the game screen at the second angle of view, it may be determined whether a resetting command is received, that is, it is determined whether to reset the camera for controlling the angle of view of the game screen. After receiving the resetting instruction, the angle of view of the game screen may be reset to obtain the third angle of view. Further, the resetting instruction may be received through a target area on the game screen of the game client, for example, received through a reset button on the game screen of the game client.

In step S902, the method may include saving the second orientation data, and obtaining third orientation data detected by the target detection apparatus.

In the foregoing step S902, after the resetting instruction is received, the second orientation data is saved, and the third orientation data detected by the target detection apparatus is obtained. The third orientation data may be used for indicating a third orientation of the mobile terminal, and the third orientation may be different from the second orientation.

After the third angle of view is obtained, the second orientation data may be saved, and the third orientation data detected by the target detection apparatus may be obtained. The third orientation data may be used for indicating the third orientation of the mobile terminal after the angle of view of the game screen is reset.

According to an embodiment, the third orientation data may be an orientation where the mobile terminal finally stops swinging.

Furthermore, the third orientation may include a third direction and a third position. The third orientation data may include third direction data and third position data. The third orientation data may be used for indicating the third orientation of the mobile terminal. The third position data may be used for indicating the third position where the mobile terminal is located.

In step S903, the method may include switching the game screen displayed by the game client from the game screen at the third angle of view to a game screen at a fourth angle of view.

In the foregoing step S903, in a case that relative orientation data between the third orientation data and the second orientation data meets the target condition, the game screen displayed by the game client may be switched from the game screen at the third angle of view to the game screen at the fourth angle of view. The third angle of view may be different from the fourth angle of view.

Accordingly, the game screen at the fourth angle of view may be a game screen that a user expects the game client to display, so as to operate the game client, thereby avoiding an unnecessary manual slide operation on a screen, and improving control efficiency of the game client.

In this embodiment, after the game screen displayed by the game client is switched from the game screen at the first angle of view to the game screen at the second angle of view, the angle of view of the game screen is reset by using the resetting instruction, to obtain the third angle of view. After receiving the resetting instruction, the second orientation data may be saved and the third orientation data detected by the target detection apparatus may be obtained. In a case that the relative orientation data between the third orientation data and the second orientation data meets the target condition, the game screen displayed by the game client may be switched from the game screen at the third angle of view to the game screen at the fourth angle of view, thereby achieving the technical effect of improving control efficiency of the game client.

Figure 10:
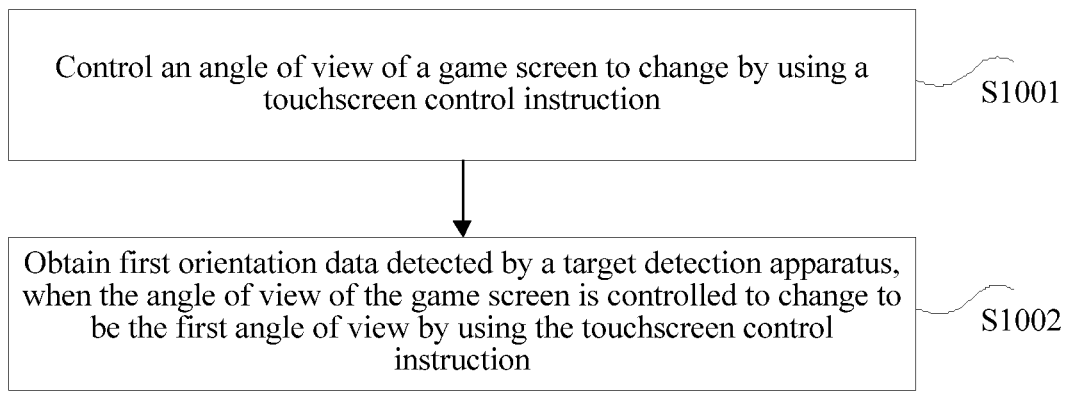
FIG. 10 is a flowchart of a method for obtaining first orientation data detected by a target detection apparatus according to an embodiment.

In another embodiment, step S202 of obtaining first orientation data detected by a target detection apparatus may further include controlling an angle of view of the game screen to change by using a touchscreen control instruction, and when a target operation is received in a target area of the game client, obtaining the first orientation data detected by the target detection apparatus. FIG. 10 is a flowchart of a method for obtaining first orientation data detected by a target detection apparatus according to an embodiment. As shown in FIG. 10, the method may include the following steps.

In step S1001, the method may include controlling an angle of view of the game screen to change by using a touchscreen control instruction.

In the foregoing step S1001, the touchscreen control instruction is generated by a touchscreen operation.

In this embodiment, the touchscreen control instruction may also be used to switch the game screen of the game client. The touchscreen control instruction may be generated by a touchscreen operation of a user. For example, the user may perform a slide operation on the screen of the mobile terminal with a finger to generate the touchscreen control instruction. After the touchscreen control instruction is received, the angle of view of the game screen may be controlled to change. The game screen may move along a movement direction of the finger of the user.

In step S1002, the method may include, when the angle of view of the game screen is controlled to change the first angle of view by using the touch screen instruction, obtaining the first orientation data detected by the target detection apparatus.

In the foregoing step S1002, when the angle of view of the game screen is controlled to change to be the first angle of view by using the touchscreen control instruction, the first orientation data detected by the target detection apparatus may be obtained.

That is, in the process of controlling the angle of view of the game screen to change by using the touchscreen control instruction, when switching of the game screen needs to be controlled using relative orientation data of the mobile terminal, the target detection apparatus may detect the relative orientation data of the mobile terminal. Therefore, in a case that the relative orientation data meets the target condition, the game screen displayed by the game client may be switched from the game screen at the first angle of view to the game screen at the second angle of view, thereby achieving the objective of combining the detection of orientation data of the mobile terminal by the target detection apparatus with the touchscreen operation, achieving the technical effect of improving control efficiency of the game client, and improving user experience.

Further, when the target operation is received in a target area of the game client, the first orientation data detected by the target detection apparatus may be obtained, where the target area may be a small map on the game client, thereby achieving the objective of combining the detection of orientation data of the mobile terminal by the target detection apparatus with the target operation, achieving the technical effect of improving control efficiency of the game client, and improving user experience.

In this embodiment, the angle of view of the game screen may be controlled to be changed by using the touchscreen control instruction. When the angle of view of the game screen is controlled to change to be the first angle of view by using the touchscreen control instruction, the first orientation data detected by the target detection apparatus may be obtained, so that the objective of controlling lens movement to switch the game screen is achieved while a manual slide operation on a screen is not replaced.

According to an embodiment, the target detection apparatus may be a gyroscope or a gravity sensor.

In this embodiment, the target detection apparatus may be incorporated in or installed on the mobile terminal and may change its position when, for example, the user moves or swings the mobile terminal. Further, the target detection apparatus may be configured to detect orientation data of the mobile terminal, and preferably with a gyroscope. An accelerometer (G-sensor) alone cannot measure or reconstruct a complete three-dimensional movement, and cannot detect a rotation movement. The accelerometer may only detect axial liner movements. The gyroscope may measure rotation and deflection movements desirably, and in this way, an actual movement of the mobile terminal may be determined through precise analysis, thereby performing a corresponding operation on the game client according to the movement of the mobile terminal, and achieving the technical effect of improving control efficiency of the game client.

Additionally, the target detection apparatus may include a gravity sensor. The gravity sensor may be a gravity sensing chip, and an inclination angle of the mobile terminal may be calculated through an angle formed with respect to the X-axis, Y-axis, and Z-axis.

The following technical solution herein is described with reference to a preferred embodiment. The technical solution of this embodiment may be applied to a mobile terminal, however, it is not limited thereto. Specifically, the target detection apparatus disposed in the mobile terminal may include a gyroscope, and is used as an example herein.

In this embodiment, the gyroscope may be used to determine an angle of view of a game screen, and may control a lens moving to a screen out of a visual range of a fixed game screen. However, the gyroscope may not be used for controlling an overall angle of view of the game screen in the whole process. In addition, an angle by which the gyroscope flips with the mobile terminal and a movement distance of the game screen may be each set to a target value.

In this embodiment, to avoid an erroneous operation in game screen switching, a minimum flipping angle value by which the gyroscope flips with the mobile terminal may be set to an angle A, and if the flipping angle value exceeds the angle A, a lens may be triggered to move the game screen by a distance value B.

For example, when the mobile terminal flips by the target angle A, the lens used for controlling the angle of view of the game screen may be triggered to move. When the lens is moved by the target distance B, the game screen stops changing, thereby avoiding an erroneous operation of game screen switching caused by minor movement of the terminal, and also ensuring the reliability of user operations.

Further, in this embodiment, during implementation of game screen switching, the target angle A has a minimum value and a maximum value, where, for example, the minimum value is 5 degrees, and the maximum value is 40 degrees.

Figure 11:
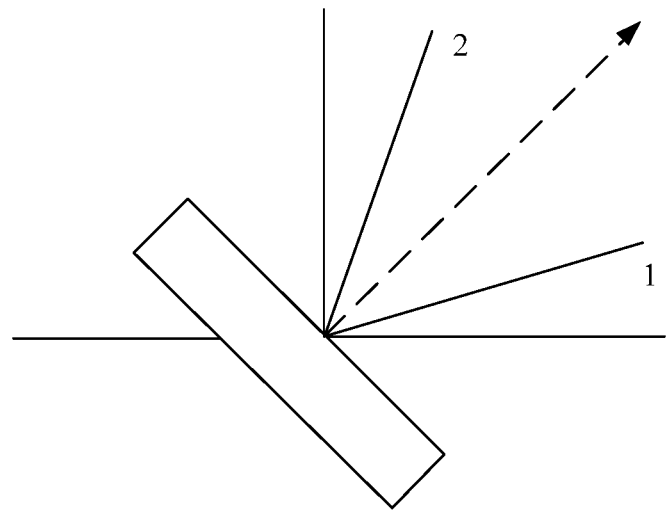
FIG. 11 is a schematic diagram of a flipping angle of a gyroscope according to an embodiment.

FIG. 11 is a schematic diagram of a flipping angle of a gyroscope according to an embodiment. As shown in FIG. 11, a virtual arrow may be used for indicating an angle of view of a game screen. When the gyroscope flips towards a lower right direction, the virtual arrow may coincide with a position 1, and the game screen displayed by the game client may be a game screen at an angle of view corresponding to the position 1. When the gyroscope flips towards an upper left direction, the virtual arrow may coincide with a position 2, and the game screen displayed by the game client may be a game screen at an angle of view corresponding to the position 2.

Figure 12:
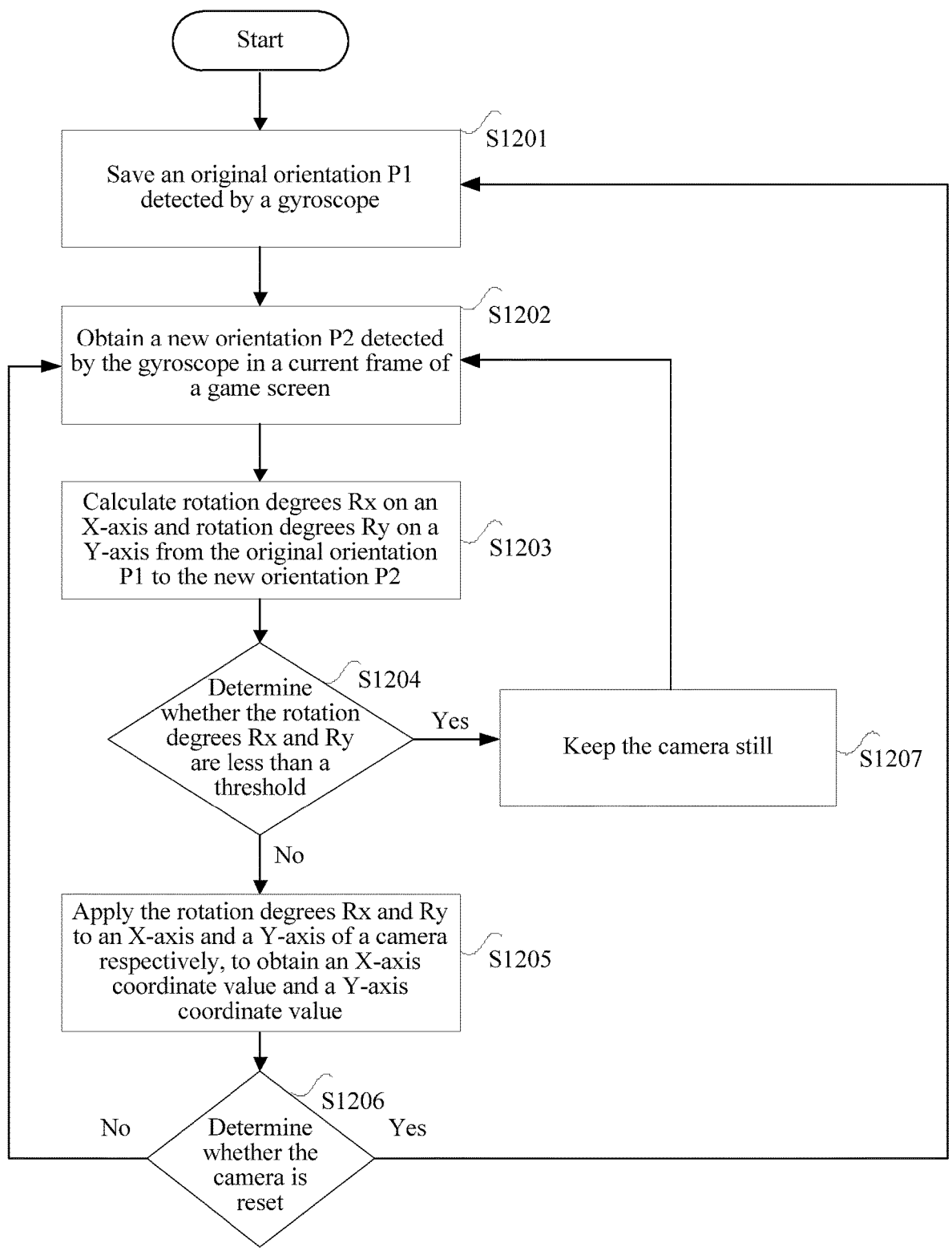
FIG. 12 is a flowchart of another game client control method according to an embodiment.

FIG. 12 is a flowchart of another game client control method according to an embodiment. As shown in FIG. 12, the method may include the following steps.

In step S1201, the method may include saving an original orientation P1 detected by a gyroscope.

In the original orientation P1, a game screen of a game client is at a first angle of view.

In step S1202, the method may include obtaining a new orientation P2 detected by the gyroscope in a current frame of a game screen.

After the original orientation P1 detected by the gyroscope is saved, the new orientation P2 detected by the gyroscope in the current frame of the game screen may be obtained. In the new orientation P2, the game screen of the game client is at the second angle of view.

In step S1203, the method may include calculating rotation degrees Rx with respect to an X-axis and rotation degrees Ry with respect to a Y-axis from the original orientation P1 to the new orientation P2.

After the new orientation P2 detected by the gyroscope in the current frame of the game screen is obtained, the rotation degrees Rx with respect to the X-axis and the rotation degrees Ry with respect to the Y-axis from the original orientation P1 to the new orientation P2 may be calculated.

In step S1204, the method may include determining whether the rotation degrees Rx and Ry are less than a threshold.

After the rotation degrees Rx on the X-axis and the rotation degrees Ry on the Y-axis from the original orientation P1 to the new orientation P2 are calculated, it may be determined whether the rotation degrees Rx and Ry are less than the threshold. If it is determined that the rotation degrees Rx and Ry are not less than the threshold, step S1205 may be performed, and if it is determined that the rotation degrees Rx and Ry are less than the threshold, step S1201 may be performed.

In step S1205, the method may include applying the rotation degrees Rx and Ry to an X-axis and a Y-axis of a camera respectively, to obtain an X-axis coordinate value and a Y-axis coordinate value.

After it is determined that the rotation degrees Rx and Ry are less than the threshold, the rotation degrees Rx and Ry may be applied to the X-axis and the Y-axis of the camera respectively, to obtain the X-axis coordinate value and the Y-axis coordinate value.

In step S1206, the method may include determining whether the camera is reset.

After the rotation degrees Rx and Ry are applied to the X-axis and the Y-axis of the camera to obtain the X-axis coordinate value and the Y-axis coordinate value, the game screen of the first angle of view may be moved by the X-axis along the direction of the X-axis, and the game screen at the first angle of view may be moved by the Y-axis coordinate value along the direction of the Y-axis, to obtain a game screen at a second angle of view. After the game screen at the second angle of view is obtained, it may be determined whether the camera for controlling the angle of view of the game screen is reset. If it is determined that the camera is not reset, step S1202 may be performed. On the other hand, if it is determined that the camera is reset, step S1201 may be performed.

In step S1207, the method may include holding the camera still.

After it is determined that the rotation degrees Rx and Ry are less than the threshold and the camera is kept still, the new orientation P2 detected by the gyroscope in the current frame of the game screen may be updated.

In this embodiment, the gyroscope is added. By limiting the flipping angle and controlling the movement distance of the lens, the objective of game screen switching may be achieved. In addition, a real-time calibration interface may also be added in a game, so that during changing of a posture of the mobile terminal, the game screen may be reset in time according to a position change of the gyroscope.

Figure 13:
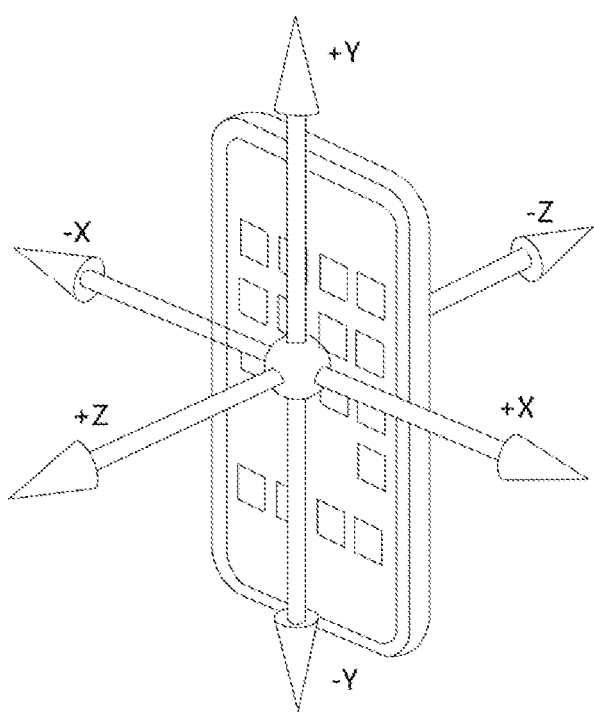
FIG. 13 is a schematic diagram of a coordinate system of a mobile terminal according to an embodiment.

FIG. 13 is a schematic diagram of a coordinate system of a mobile terminal according to an embodiment. As shown in FIG. 13, the coordinate system of the mobile terminal is a three-dimensional coordinate system, including an X-axis, a Y-axis, and a Z-axis. The X-axis includes −X and +X, the Y-axis includes −Y and +Y, and the Z-axis includes −Z and +Z. According to an embodiment, rotation degrees on the Y-axis from the first orientation data to the second orientation data of the mobile terminal detected by the gyroscope may be calculated, and rotation degrees on the X-axis from the first orientation data to the second orientation data may be calculated. When the second orientation data changes with respect to the first orientation data on the Z-axis, it may be determined that the position of the mobile terminal is deviated, and the angle of view of the game screen may need to be reset.

The gyroscope may be superimposed with a manual slide operation on a screen and a small map of the game screen, thereby ensuring consistency of operation experience.

According to an embodiment, a reset button may further be added in a game. The reset button ensures real-time calibration when the position of the mobile terminal is deviated.

Because principles of the gyroscope and a gravity sensor are similar, the same method may be implemented by the gravity sensor. The gravity sensing and the gyroscope have different hardware implementations, however, they may be used interchangeably.

An application environment may be referenced to, but is not limited to, the application environment in the foregoing embodiment. The embodiments of the present disclosure provide examples for implementing the game client control method.

The game client may include an operation setting interface on the mobile terminal. The operation setting interface of the game client is further described herein.

Figure 14:
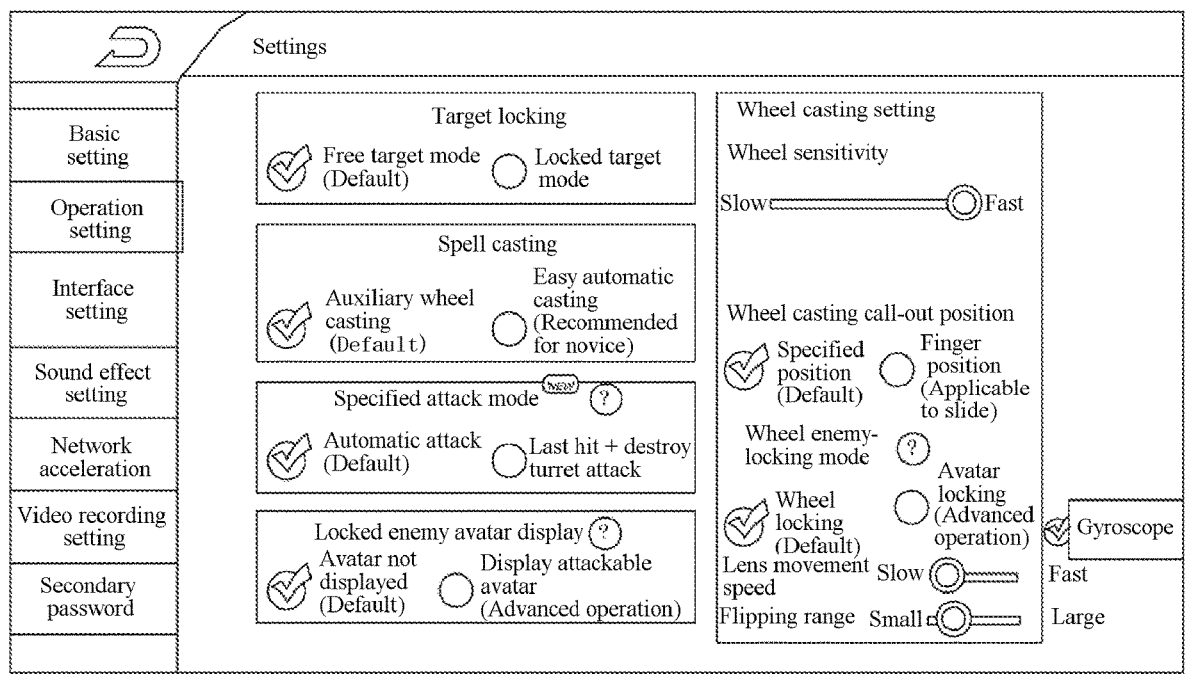
FIG. 14 is a schematic diagram of an operation setting interface according to an embodiment.

FIG. 14 is a schematic diagram of an operation setting interface according to an embodiment. As shown in FIG. 14, the operation setting interface may be used for debugging the gyroscope, including setting a flipping range and setting a lens movement speed. When an operation interface is opened, gyroscope debugging at a lower right corner is disabled by default. After gyroscope debugging is checked, gyroscope parameter adjustment is called out. For example, adjustment of the lens movement speed is a corresponding lens movement speed when the gyroscope flips by a particular angle. When the lens movement speed increases, the game screen of the game client is more quickly switched from the game screen at the first angle of view to the game screen at the second angle of view. As another example, in adjustment of the flipping range, when an angle by which the gyroscope flips with the mobile terminal exceeds the flipping range, the lens for controlling the angle of view of the game screen starts to move. When the flipping range is smaller, it is easier to trigger the lens to move. When the flipping range is larger, it is more difficult to trigger the lens to move.

Figure 15:
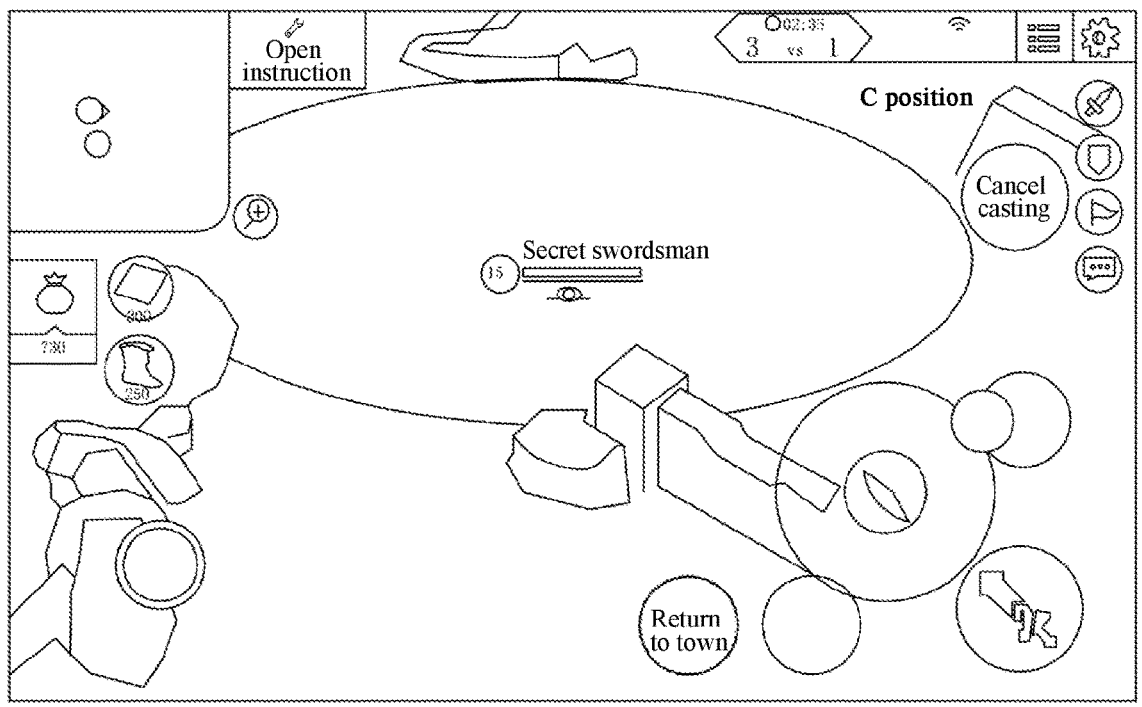
FIG. 15 is a schematic diagram of a game screen displayed by a game client according to an embodiment.

FIG. 15 is a schematic diagram of a game screen displayed by a game client according to an embodiment. FIG. 15 shows a product application scenario of a game client control method. When a user wants to precisely attack the C position of group initiation at the upper right corner of the enemy through a virtual character, but cannot see that far on the screen or the position is not clearly displayed, in this case, the game screen of the game client is a game screen at a first angle of view.

Figure 16:
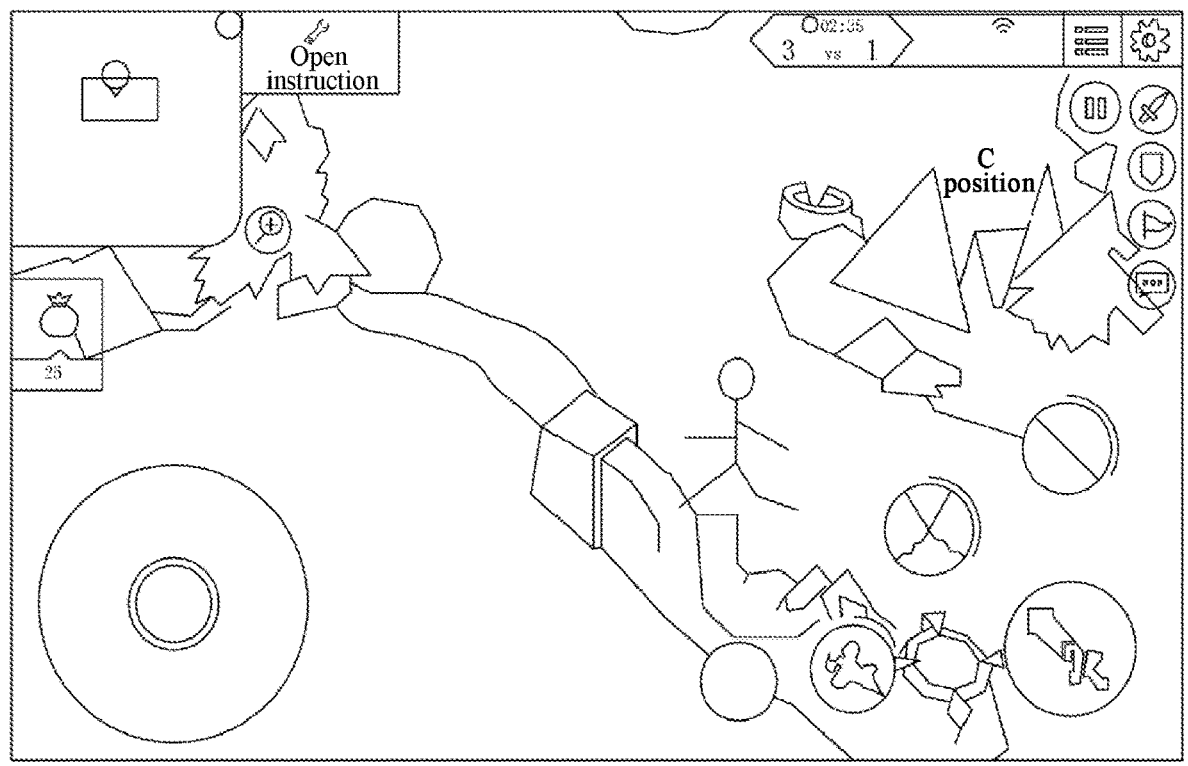
FIG. 16 is a schematic diagram of another game screen displayed by a game client according to an embodiment.

FIG. 16 is a schematic diagram of another game screen displayed by a game client according to an embodiment. FIG. 16 shows another product application scenario of a game client control method. The game screen is a game screen at a second angle of view obtained from the game screen shown in FIG. 15 after the gyroscope flips towards an upper right direction. For example, by flipping the gyroscope towards the upper right direction, a first game screen is moved to obtain the game screen at the second angle of view. As such, the C position of group initiation may be clearly displayed, thereby achieving the objective of precisely attacking the C position of group initiation at the upper right corner.

Figure 17:
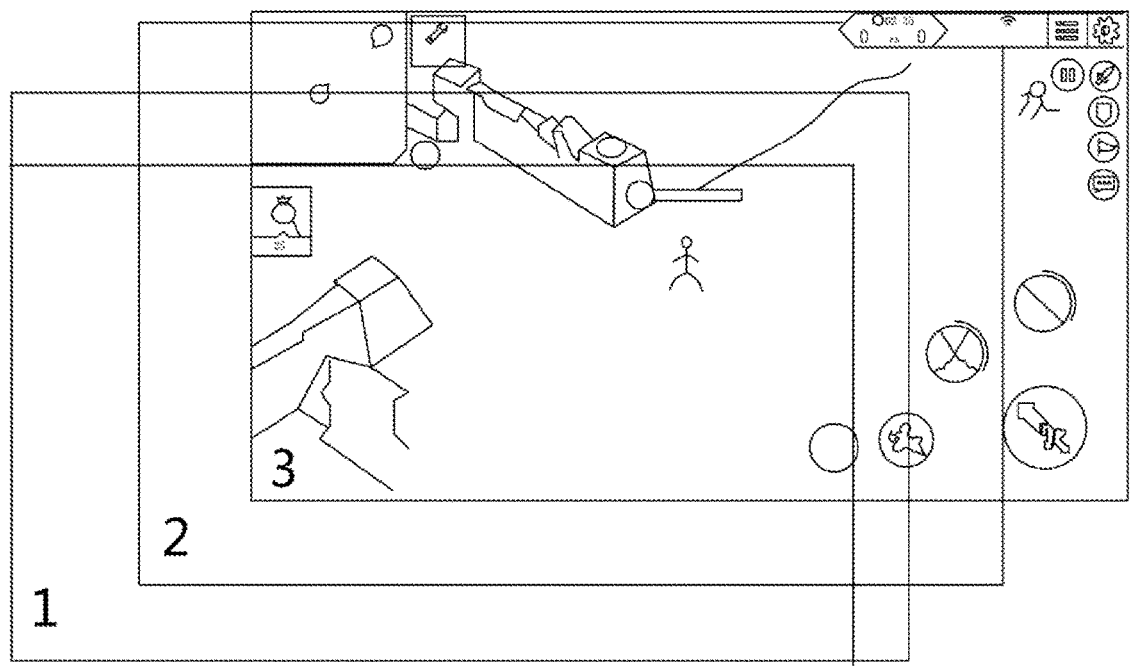
FIG. 17 is a schematic diagram of yet another game screen displayed by a game client according to an embodiment.

FIG. 17 is a schematic diagram of another game screen displayed by a game client according to an embodiment. FIG. 17 shows another product application scenario of a game client control method. When a user wants to observe the situation at the lower left corner through a virtual character, the gyroscope may flip with the mobile terminal, so that the lens may be controlled to move the angle of view of the game to achieve the objective of game screen switching, for example, switching among game screens represented by rectangular frames 1, 2, and 3.

Figure 18:
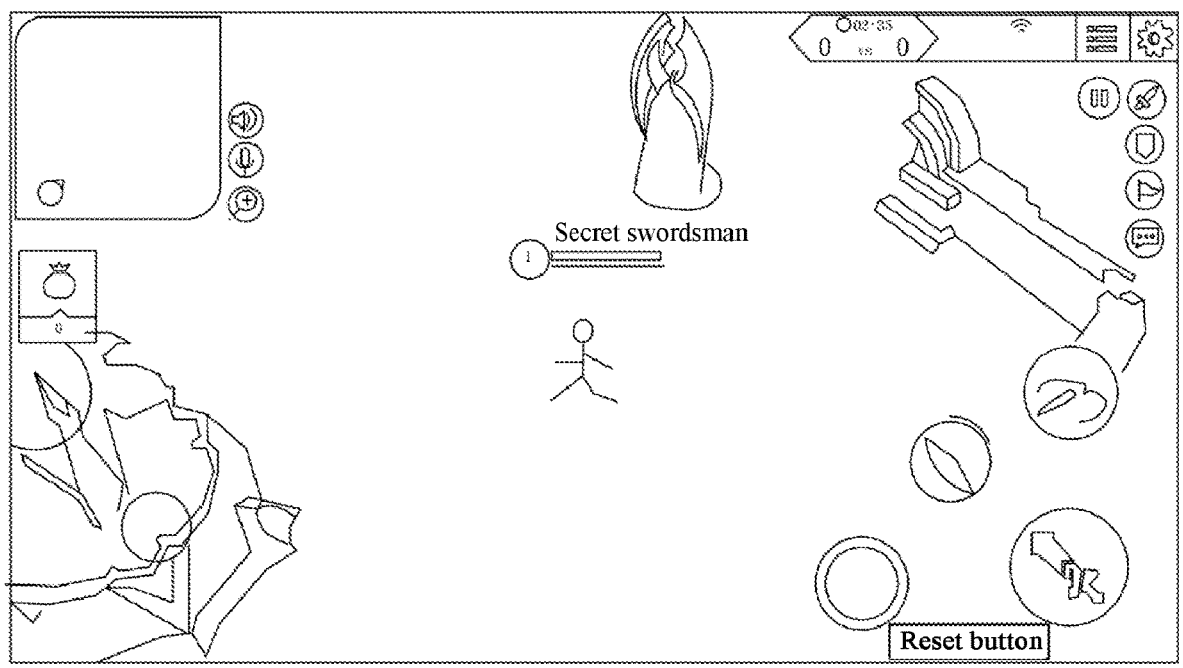
FIG. 18 is a schematic diagram of a reset button of a game client according to an embodiment.

FIG. 18 is a schematic diagram of a reset button of a game client according to an embodiment. FIG. 18 shows another product application scenario of a game client control method. A circle at the lower right corner of the screen represents a reset button. After clicking the reset button, a user may reset the lens for controlling the angle of view of the game screen.

Generally, when sliding a right screen to move a lens on the right, a game player cannot operate other interface button on the right screen. According to the embodiments of the present disclosure, unnecessary screen slide movement with a right hand can be avoided through gyroscope lens movement. Specifically, gyroscope lens movement may be used to assist in lens control of a mobile phone MOBA game, thereby making a breakthrough for introducing a joystick into MOBA mobile games, providing convenience for a game player at a critical moment in a game, allowing a game player to perform a high-precision operation, and improving control efficiency of a game client.

For ease of description, the foregoing method embodiments are described as a series of combinations. However, it may be understood by a person skilled in the art that the present disclosure is not limited to the described sequence of actions, because some steps may be performed in another sequence or performed at the same time.

According to the embodiments described herein, a person skilled in the art may clearly understand that the method according to the embodiments herein may be implemented by software or hardware, and may also be implemented by both. Based on such understanding, the technical solutions herein may be implemented in the form of a software product. The software product may be stored in a storage medium, such as ROM/RAM, magnetic disk, or optical disc, and may include several instructions for instructing a terminal device, such as a mobile phone, a computer, a server, a network device, or the like, to perform the methods described in the embodiments of the present disclosure.

Figure 19:
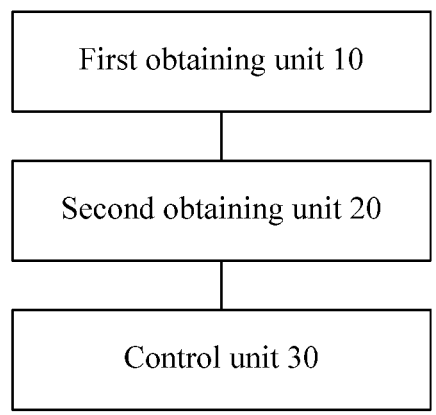
FIG. 19 is a schematic diagram of a game client control apparatus according to an embodiment.

According to an embodiment, a game client control apparatus configured to implement the foregoing game client control method is further provided. FIG. 19 is a schematic diagram of a game client control apparatus according to an embodiment. As shown in FIG. 19, the apparatus may include a first obtaining unit 10, a second obtaining unit 20, and a control unit 30.

The first obtaining unit 10 may be configured to obtain, during the operation of a game client, first orientation data detected by a target detection apparatus, the game client being installed in a mobile terminal, the target detection apparatus being disposed in the mobile terminal, a game screen of the game client being at a first angle of view according to the first orientation data, and the first orientation data being used for indicating a first orientation of the mobile terminal.

The second obtaining unit 20 may be configured to obtain, during the movement of the mobile terminal, second orientation data detected by the target detection apparatus, the second orientation data being used for indicating a second orientation of the mobile terminal, and the second orientation being different from the first orientation.

The control unit 30 may be configured to switch the game screen displayed by the game client from the game screen at the first angle of view to a game screen at a second angle of view in a case that relative orientation data between the second orientation data and the first orientation data meets a target condition, the second angle of view being different from the first angle of view.

The first obtaining unit 10 may be configured to perform the method described in step S202, the second obtaining unit 20 may be configured to perform the method described in step S204, and the control unit 30 may be configured to perform the method described in step S206.

The foregoing units may implement the same embodiment and application scenario as the corresponding steps, but are not limited to the content disclosed in the foregoing embodiment. As part of the apparatus, the foregoing units may be implemented in the hardware environment shown in FIG. 1, and may be implemented by software or hardware. The hardware environment may include a network environment.

According to another aspect of the embodiments, an electronic apparatus configured to implement the foregoing game client control method is further provided.

Figure 20:
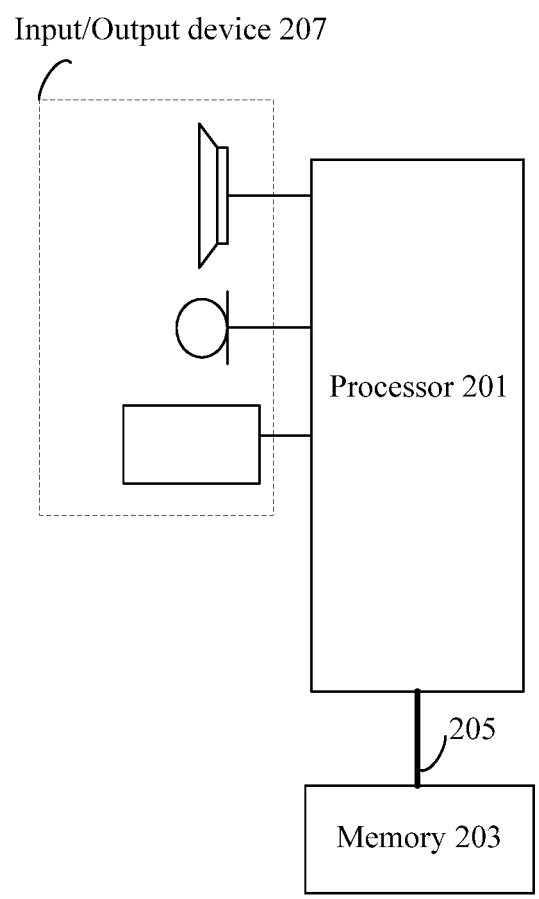
FIG. 20 is a structural block diagram of an electronic apparatus according to an embodiment.

FIG. 20 is a structural block diagram of an electronic apparatus according to an embodiment. As shown in FIG. 20, the electronic apparatus may include one or more processors 201, a memory 203, a transmission apparatus 205 and an input/output device 207.

The memory 203 may be configured to store a software program and modules, for example, program instructions/modules corresponding to the game client control method in the embodiments herein. By running the software program and modules stored in the memory 203, the processor 201 performs various functions and data processing, implementing the foregoing game client control method. The memory 203 may include a high-speed random memory, a nonvolatile memory, one or more magnetic storage apparatuses, flash memories or other nonvolatile solid-state memories. In some embodiments, the memory 203 may further include memories remotely disposed relative to the processor 201, and these remote memories may be connected to the electronic apparatus through a network. Examples of the network include, but are not limited to, the Internet, an intranet, a local area network, a mobile communications network, or a combination thereof.

The foregoing transmission apparatus 205 may be configured to receive or send data through a network, and may also be configured to implement data transmission between the processor and the memory. Specific examples of the network may include a wired network and a wireless network. In an embodiment, the transmission apparatus 205 may include a network interface controller (NIC), and may be connected to a router through a network and another network device, thereby communicating with the Internet or a local area network. Further, the transmission apparatus 205 may be a radio frequency (RF) module configured to communicate with the Internet in a wireless manner.

In addition, the memory 203 may be configured to store an application program.

The processor 201 may invoke, through the transmission apparatus 205, the application program stored by the memory 203, to perform the following steps: obtaining, during running of a game client, first orientation data detected by a target detection apparatus, the game client being installed in a mobile terminal, the target detection apparatus being disposed in the mobile terminal, a game screen of the game client being at a first angle of view according to the first orientation data, and the first orientation data being used for indicating a first orientation of the mobile terminal; obtaining, during movements of the mobile terminal, second orientation data detected by the target detection apparatus, the second orientation data being used for indicating a second orientation of the mobile terminal, and the second orientation being different from the first orientation; and switching the game screen displayed by the game client from the game screen at the first angle of view to a game screen at a second angle of view in a case that relative orientation data between the second orientation data and the first orientation data meets a target condition, the second angle of view being different from the first angle of view.

The processor 201 may be further configured to, in the process of switching the game screen displayed by the game client from the game screen at the first angle of view to a game screen at a second angle of view, receive an operation instruction through the game client, the operation instruction being used for instructing the game client to perform a target operation, and control the game client to perform the target operation after the operation instruction is received.

The processor 201 may be further configured to, before switching the game screen displayed by the game client from the game screen at the first angle of view to the game screen at the second angle of view, obtain rotation data for changing the first orientation data to be the second orientation data, the rotation data being used for indicating a rotation angle by which the mobile terminal rotates from the first orientation to the second orientation, and the relative orientation data including the rotation data; and determine that the relative orientation data meets the target condition based on the rotation data being greater than or equal to a first threshold.

The processor 201 may be further configured to obtain first rotation data about rotation of the mobile terminal around a first coordinate axis and second rotation data about rotation of the mobile terminal around a second coordinate axis during changing from the first orientation data to the second orientation data, the first rotation data being used for indicating a rotation angle by which the mobile terminal rotates around the first coordinate axis, and the second rotation data being used for indicating a rotation angle by which the mobile terminal rotates around the second coordinate axis; and determine that the relative orientation data meets the target condition based on the first rotation data being greater than or equal to the first threshold, and the second rotation data being greater than or equal to the first threshold.

The processor 201 may be further configured to obtain a first coordinate value corresponding to the first rotation data and a second coordinate value corresponding to the second rotation data in a case that the relative orientation data between the second orientation data and the first orientation data meets the target condition, the first coordinate value being used to determine the game screen at the second angle of view in a first direction, and the second coordinate value being used to determine the game screen at the second angle of view in a second direction; and moving the game screen at the first angle of view by the first coordinate value in the first direction and moving the game screen at the first angle of view by the second coordinate value in the second direction based on determining that the relative orientation data meets the target condition, to obtain the game screen at the second angle of view.

The processor 201 may be further configured to move the game screen at the first angle of view by a target movement distance corresponding to the first threshold, to obtain the game screen at the second angle of view in a case that the relative orientation data between the second orientation data and the first orientation data meets the target condition.

The processor 201 may be further configured to determine that the relative orientation data meets the target condition based on the rotation data being greater than or equal to the first threshold and being less than a second threshold.

The processor 201 may be further configured to, before switching the game screen displayed by the game client from the game screen at the first angle of view to the game screen at the second angle of view, receive a first adjustment parameter, the first adjustment parameter being used to adjust the first threshold to be a third threshold, and determine that the relative orientation data meets the target condition based on the rotation data being greater than or equal to the third threshold.

The processor 201 may be further configured to, before switching the game screen displayed by the game client from the game screen at the first angle of view to the game screen at the second angle of view, receive a second adjustment parameter, the second adjustment parameter being used to adjust a changing speed at which the game screen changes from the first angle of view to the second angle of view, to obtain a target changing speed, and control the game screen of the game client to change from the first angle of view to the second angle of view according to the target changing speed.

The processor 201 may be further configured to, after switching the game screen displayed by the game client from the game screen at the first angle of view to the game screen at the second angle of view, receive a resetting instruction, the resetting instruction being used for resetting an angle of view of the game screen, to obtain a third angle of view; saving the second orientation data after receiving the resetting instruction, and obtaining third orientation data detected by the target detection apparatus, the third orientation data being used to indicate a third orientation of the mobile terminal, and the third orientation being different from the second orientation; and switching the game screen displayed by the game client from the game screen at the third angle of view to a game screen at a fourth angle of view in a case that relative orientation data between the third orientation data and the second orientation data meets the target condition, the third angle of view being different from the fourth angle of view.

The processor 201 may be further configured to control an angle of view of the game screen to change by using a touchscreen control instruction, the touchscreen control instruction being generated by a touchscreen operation; and obtain the first orientation data detected by the target detection apparatus based on the angle of view of the game screen being controlled to be changed to the first angle of view by using the touchscreen control instruction; or obtain the first orientation data detected by the target detection apparatus based on a target operation being received in a target area of the game client.

During the operation of a game client, first orientation data detected by a target detection apparatus may be obtained, and a game screen of the game client may be at a first angle of view according to the first orientation data. A second orientation data detected by the target detection apparatus may be obtained, and the second orientation data may be used for indicating a second orientation of a mobile terminal. Based on relative orientation data between the second orientation data and the first orientation data meeting a target condition, the game screen displayed by the game client may be switched from the game screen at the first angle of view to a game screen at a second angle of view. Orientation data of the mobile terminal during swinging may be detected by the target detection apparatus, and based on a change in the orientation data meeting a particular condition, the game screen may be controlled to be changed, so that an unnecessary manual slide operation on a screen is avoided, thereby achieving a technical effect of improving control efficiency of the game client, and resolving the technical problem of low efficiency of game client control in the related technology.

A person of ordinary skill in the art may understand that, the structure shown in FIG. 20 is merely an example. The electronic apparatus may be a terminal device, such as a smartphone (e.g., an Android phone or an iOS phone), a tablet computer, a palmtop computer, a mobile internet device (MID), and a PAD. FIG. 20 does not limit the structure of the foregoing electronic apparatus. For example, the electronic apparatus may further include more or fewer components, such as a network interface and a display apparatus than those shown in FIG. 20, or may have a configuration different than that shown in FIG. 20.

A person of ordinary skill in the art may understand that all or some of steps in the various methods in the foregoing embodiments may be completed through a program instructing relevant hardware of a terminal device. The program may be stored in a computer readable storage medium. The storage medium may include a flash memory, a read-only memory (ROM), a random access memory (RAM), a magnetic disk, an optical disc, or the like.

An embodiment of the present disclosure further provides a storage medium. The foregoing storage medium may be configured to perform program code of a game client control method.

The storage medium may be located on at least one network device in multiple network devices in the network shown in the foregoing embodiment.

According to an embodiment, the storage medium may be configured to store program code for obtaining, during running of a game client, first orientation data detected by a target detection apparatus, the game client being installed in a mobile terminal, the target detection apparatus being disposed in the mobile terminal, a game screen of the game client being at a first angle of view according to the first orientation data, and the first orientation data being used for indicating a first orientation of the mobile terminal; obtaining, during swinging of the mobile terminal, second orientation data detected by the target detection apparatus, the second orientation data being used for indicating a second orientation of the mobile terminal, and the second orientation being different from the first orientation; and switching the game screen displayed by the game client from the game screen at the first angle of view to a game screen at a second angle of view in a case that relative orientation data between the second orientation data and the first orientation data meets a target condition, the second angle of view being different from the first angle of view.

The storage medium may be further configured to store program code for, in the process of switching the game screen displayed by the game client from the game screen at the first angle of view to the game screen at the second angle of view, receiving an operation instruction through the game client, the operation instruction being used to instruct the game client to perform a target operation; and controlling the game client to perform the target operation after the operation instruction is received.

The storage medium may be further configured to store program code for, before switching the game screen displayed by the game client from the game screen at the first angle of view to the game screen at the second angle of view, obtaining rotation data for changing the first orientation data to be the second orientation data, the rotation data being used for indicating a rotation angle by which the mobile terminal rotates from the first orientation to the second orientation, and the relative orientation data including the rotation data; and determining that the relative orientation data meets the target condition in a case that the rotation data is greater than or equal to a first threshold.

The storage medium may be further configured to store program code for obtaining first rotation data on a rotation of the mobile terminal around a first coordinate axis and second rotation data on a rotation of the mobile terminal around a second coordinate axis during changing from the first orientation data to the second orientation data, the first rotation data being used for indicating a rotation angle by which the mobile terminal rotates around the first coordinate axis, and the second rotation data being used for indicating a rotation angle by which the mobile terminal rotates around the second coordinate axis; and determining that the relative orientation data meets the target condition based on the first rotation data being greater than or equal to the first threshold, and the second rotation data being greater than or equal to the first threshold.

The storage medium may be further configured to store program code for, in a case that the relative orientation data between the second orientation data and the first orientation data meets the target condition, obtaining a first coordinate value corresponding to the first rotation data and a second coordinate value corresponding to the second rotation data, the first coordinate value being used for determining the game screen at the second angle of view in a first direction, and the second coordinate value being used for determining the game screen at the second angle of view in a second direction; and moving the game screen at the first angle of view by the first coordinate value in the first direction and moving the game screen at the first angle of view by the second coordinate value in the second direction based on determining that the relative orientation data meets the target condition, to obtain the game screen at the second angle of view.

The storage medium may be further configured to store program code for, in a case that the relative orientation data between the second orientation data and the first orientation data meets the target condition, moving the game screen at the first angle of view by a target movement distance corresponding to the first threshold, to obtain the game screen at the second angle of view.

The storage medium may be further configured to store program code for determining that the relative orientation data meets the target condition based on the rotation data being greater than or equal to the first threshold and being less than a second threshold.

The storage medium may be further configured to store program code for, before switching the game screen displayed by the game client from the game screen at the first angle of view to the game screen at the second angle of view, receiving a first adjustment parameter, the first adjustment parameter being used for adjusting the first threshold to be a third threshold; and determining that the relative orientation data meets the target condition based on the rotation data being greater than or equal to the third threshold.

The storage medium may be further configured to store program code for, before switching the game screen displayed by the game client from the game screen at the first angle of view to the game screen at the second angle of view, receiving a second adjustment parameter, the second adjustment parameter being used to adjust a changing speed at which the game screen changes from the first angle of view to the second angle of view, to obtain a target changing speed; and controlling the game screen of the game client to change from the first angle of view to the second angle of view according to the target changing speed.

The storage medium may be further configured to store program code for, after switching the game screen displayed by the game client from the game screen at the first angle of view to the game screen at the second angle of view, receiving a resetting instruction, the resetting instruction being used to reset an angle of view of the game screen, to obtain a third angle of view; saving the second orientation data after receiving the resetting instruction, and obtaining third orientation data detected by the target detection apparatus, the third orientation data being used for indicating a third orientation of the mobile terminal, and the third orientation being different from the second orientation; and switching the game screen displayed by the game client from the game screen at the third angle of view to a game screen at a fourth angle of view in a case that relative orientation data between the third orientation data and the second orientation data meets the target condition, the third angle of view being different from the fourth angle of view.

The storage medium may be further configured to store program code for controlling an angle of view of the game screen to change by using a touchscreen control instruction, the touchscreen control instruction being generated by a touchscreen operation; and obtaining the first orientation data detected by the target detection apparatus, in a case that the angle of view of the game screen is controlled to change to be the first angle of view by using the touchscreen control instruction; or obtaining the first orientation data detected by the target detection apparatus, in a case that a target operation is received in a target area of the game client.

The storage medium may include, but is not limited to, various media capable of storing program code, such as a USB disk, a read-only memory (ROM), a random access memory (RAM), a removable hard disk, a magnetic disk, or an optical disc.

Serial numbers of the embodiments in the present disclosure are merely used for description, and do not represent preference of the embodiments.

When implemented on a software function unit and used as a stand-alone product, the integrated unit in the foregoing embodiment may be stored in a computer readable storage medium. Based on such understanding, the essence of the technical solution of the present disclosure, or a part contributing to the related technology, or a part of or all of the technical solution may be embodied in the form of a software product. The computer software product may be stored in a storage medium, and include several instructions for instructing one or more computer devices, for example, a personal computer, a server, or a network device, to perform all or some of the steps of the methods in various embodiments of the present disclosure.

In the foregoing embodiments, the descriptions of the embodiments have respective focuses. For a part that is not described in detail in an embodiment, reference may be made to related descriptions in other embodiments.

In the embodiments of the present disclosure, it is to be appreciated that the disclosed game client may be implemented in other manners. The described apparatus embodiment is merely an example. For example, the unit division is merely a logical function division, and there may be other division manners in actual implementation. For example, a plurality of units or components may be combined or integrated into another system, or some features may be ignored or not performed. In addition, the described mutual couplings or direct couplings or communication connections may be implemented through some interfaces. The indirect couplings or communication connections between units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

Described above are merely preferred embodiments of the present disclosure. It is to be noted that, a person of ordinary skill in the art may make several improvements and modifications without departing from the principle of the present disclosure. The improvements and modifications may also be considered as within the protection scope of the present disclosure.

What is claimed is:

1. A game client control method, the method performed by at least one processor and comprising:
   obtaining first orientation data detected by a target detection apparatus, a game client being installed on a mobile terminal, the target detection apparatus being disposed in the mobile terminal, a game screen of the game client being at a first angle of view according to the first orientation data, and the first orientation data comprising a first orientation of the mobile terminal;
   obtaining, during movement of the mobile terminal, second orientation data detected by the target detection apparatus, the second orientation data comprising a second orientation of the mobile terminal, and the second orientation data being different from the first orientation; and
   switching the game screen displayed by the game client from the game screen at the first angle of view to a game screen at a second angle of view based on relative orientation data between the second orientation data and the first orientation data satisfying a target condition, the second angle of view being different from the first angle of view,
   wherein the switching further comprises:
      receiving a second adjustment parameter, the second adjustment parameter being used to adjust a changing speed at which the game screen changes from the first angle of view to the second angle of view, to obtain a target changing speed; and
      controlling the game screen of the game client to change from the first angle of view to the second angle of view according to the target changing speed.

2. The method according to claim 1, wherein the switching further comprises:
   receiving an operation instruction through the game client, the operation instruction instructing the game client to perform a target operation; and
   controlling the game client to perform the target operation based on the received operation instruction.

3. The method according to claim 1, wherein the switching further comprises:
   obtaining rotation data for changing from the first orientation to the second orientation, the rotation data indicating a rotation angle by which the mobile terminal rotates from the first orientation to the second orientation, and the relative orientation data comprising the rotation data; and
   determining that the relative orientation data satisfies the target condition based on the rotation data being greater than or equal to a first threshold.

4. The method according to claim 3, wherein
   the obtaining rotation data for changing the first orientation data to be the second orientation data further comprises:
      obtaining first rotation data on a rotation of the mobile terminal around a first coordinate axis and second rotation data on a rotation of the mobile terminal around a second coordinate axis during changing from the first orientation to the second orientation, the first rotation data comprising a rotation angle by which the mobile terminal rotates around the first coordinate axis, and the second rotation data comprising a rotation angle by which the mobile terminal rotates around the second coordinate axis; and
   wherein the determining that the relative orientation data satisfies the target condition based on the rotation data being greater than or equal to the first threshold further comprises:
      determining that the relative orientation data satisfies the target condition based on the first rotation data being greater than or equal to the first threshold, and the second rotation data being greater than or equal to the first threshold.

5. The method according to claim 4, wherein the switching further comprises:
   obtaining a first coordinate value corresponding to the first rotation data and a second coordinate value corresponding to the second rotation data, the first coordinate value being used for determining the game screen at the second angle of view in a first direction, and the second coordinate value being used for determining the game screen at the second angle of view in a second direction; and moving the game screen at the first angle of view by the first coordinate value in the first direction and moving the game screen at the first angle of view by the second coordinate value in the second direction based on determining that the relative orientation data satisfies the target condition, to obtain the game screen at the second angle of view.

6. The method according to claim 3, wherein the switching further comprises:

moving the game screen at the first angle of view by a target movement distance corresponding to the first threshold, to obtain the game screen at the second angle of view.

7. The method according to claim 3, wherein the determining that the relative orientation data satisfies the target condition based on the rotation data being greater than or equal to the first threshold further comprises:

determining that the relative orientation data satisfies the target condition based on the rotation data being greater than or equal to the first threshold and being less than a second threshold.

8. The method according to claim 3, wherein the switching further comprises receiving a first adjustment parameter, the first adjustment parameter being used to adjust the first threshold to be a third threshold; and wherein the determining that the relative orientation data satisfies the target condition further comprises determining that the relative orientation data satisfies the target condition based on the rotation data being greater than or equal to the third threshold.

9. The method according to claim 1, wherein the switching further comprises:

receiving a resetting instruction, the resetting instruction for resetting an angle of view of the game screen, to obtain a third angle of view;

saving the second orientation data after receiving the resetting instruction, and obtaining third orientation data detected by the target detection apparatus, the third orientation data comprising a third orientation of the mobile terminal, and the third orientation being different from the second orientation; and switching the game screen displayed by the game client from the game screen at the third angle of view to a game screen at a fourth angle of view based on relative orientation data between the third orientation data and the second orientation data satisfying the target condition, the third angle of view being different from the fourth angle of view.

10. The method according to claim 1, wherein the obtaining first orientation data detected by the target detection apparatus further comprises:

controlling an angle of view of the game screen to change by using a touchscreen control instruction, the touchscreen control instruction being generated by a touchscreen operation; and obtaining the first orientation data detected by the target detection apparatus based on controlling the angle of view of the game screen to change to be the first angle of view by using the touchscreen control instruction; or obtaining the first orientation data detected by the target detection apparatus based on receiving a target operation in a target area of the game client.

11. The method according to claim 1, wherein the target detection apparatus is at least one of a gyroscope and a gravity sensor.

12. A game client control apparatus comprising:

at least one memory configured to store computer program code; and at least one processor configured to access the computer program code and operate as instructed by the computer program code, the computer program code comprising:

first obtaining code configured to cause the at least one processor to obtain first orientation data detected by a target detection apparatus, a game client being installed on a mobile terminal, the target detection apparatus being disposed in the mobile terminal, a game screen of the game client being at a first angle of view according to the first orientation data, and the first orientation data comprising a first orientation of the mobile terminal;

second obtaining code configured to cause the at least one processor to obtain, during movement of the mobile terminal, second orientation data detected by the target detection apparatus, the second orientation data comprising a second orientation of the mobile terminal, and the second orientation being different from the first orientation; and control code configured to cause the at least one processor to:

switch the game screen displayed by the game client from the game screen at the first angle of view to a game screen at a second angle of view based on relative orientation data between the second orientation data and the first orientation data satisfying a target condition, the second angle of view being different from the first angle of view;

receive a second adjustment parameter, the second adjustment parameter being used to adjust a changing speed at which the game screen changes from the first angle of view to the second angle of view, to obtain a target changing speed; and control the game screen of the game client to change from the first angle of view to the second angle of view according to the target changing speed.

13. A non-transitory computer-readable storage medium, storing executable instructions, the executable instructions capable of causing a computer to:

obtain first orientation data detected by a target detection apparatus, a game client being installed on a mobile terminal, the target detection apparatus being disposed in the mobile terminal, a game screen of the game client being at a first angle of view according to the first orientation data, and the first orientation data comprising a first orientation of the mobile terminal;

obtain, during movement of the mobile terminal, second orientation data detected by the target detection apparatus, the second orientation data comprising a second orientation of the mobile terminal, and the second orientation being different from the first orientation;

switch the game screen displayed by the game client from the game screen at the first angle of view to a game screen at a second angle of view based on relative orientation data between the second orientation data and the first orientation data satisfying a target condition, the second angle of view being different from the first angle of view;

receive a second adjustment parameter, the second adjustment parameter being used to adjust a changing speed at which the game screen changes from the first angle of view to the second angle of view, to obtain a target changing speed; and control the game screen of the game client to change from the first angle of view to the second angle of view according to the target changing speed.

14. An electronic apparatus, comprising a memory, a processor, and a computer program that is stored in the memory and is operable on the processor, the processor performing the game client control method according to claim 1.

15. The game client control apparatus according to claim 12, wherein the control code is further configured to cause the at least one processor to:

receive an operation instruction through the game client, the operation instruction instructing the game client to perform a target operation; and control the game client to perform the target operation based on the received operation instruction.

16. The game client control apparatus according to claim 12, wherein the control code is further configured to cause the at least one processor to:

obtain rotation data for changing from the first orientation to the second orientation, the rotation data indicating a rotation angle by which the mobile terminal rotates from the first orientation to the second orientation, and the relative orientation data comprising the rotation data; and determine that the relative orientation data satisfies the target condition based on the rotation data being greater than or equal to a first threshold.

17. The game client control apparatus according to claim 16, wherein the control code is further configured to cause the at least one processor to:

obtain first rotation data on a rotation of the mobile terminal around a first coordinate axis and second rotation data on a rotation of the mobile terminal around a second coordinate axis during changing from the first orientation to the second orientation, the first rotation data comprising a rotation angle by which the mobile terminal rotates around the first coordinate axis, and the second rotation data comprising a rotation angle by which the mobile terminal rotates around the second coordinate axis; and determine that the relative orientation data satisfies the target condition based on the first rotation data being greater than or equal to the first threshold, and the second rotation data being greater than or equal to the first threshold.

18. The non-transitory computer-readable storage medium according to claim 13, wherein the executable instructions are further capable of causing the computer to:

receive an operation instruction through the game client, the operation instruction instructing the game client to perform a target operation; and control the game client to perform the target operation based on the received operation instruction.

19. The non-transitory computer-readable storage medium according to claim 13, wherein the executable instructions are further capable of causing the computer to:

obtain rotation data for changing from the first orientation to the second orientation, the rotation data indicating a rotation angle by which the mobile terminal rotates from the first orientation to the second orientation, and the relative orientation data comprising the rotation data; and determine that the relative orientation data satisfies the target condition based on the rotation data being greater than or equal to a first threshold.

\* \* \* \* \*